(12) United States Patent
Jevremovic et al.

(10) Patent No.: US 11,936,317 B2
(45) Date of Patent: Mar. 19, 2024

(54) LOW-VOLTAGE FAULT-TOLERANT ROTATING ELECTROMECHANICAL ACTUATORS, AND ASSOCIATED SYSTEMS AND METHODS

(71) Applicant: Blue Origin, LLC, Kent, WA (US)

(72) Inventors: Vladan Jevremovic, Issaquah, WA (US); Adrian Alberto Galindo, Seattle, WA (US); Austin Gaspar, Kent, WA (US)

(73) Assignee: Blue Origin, LLC, Kent, WA (US)

( * ) Notice: Subject to any disclaimer, the term of this patent is extended or adjusted under 35 U.S.C. 154(b) by 37 days.

(21) Appl. No.: 17/173,138

(22) Filed: Feb. 10, 2021

(65) Prior Publication Data

US 2022/0255482 A1 Aug. 11, 2022

(51) Int. Cl.
*H02P 25/22* (2006.01)
*H02K 1/278* (2022.01)
*H02P 6/08* (2016.01)

(52) U.S. Cl.
CPC ............. *H02P 25/22* (2013.01); *H02K 1/278* (2013.01); *H02P 6/08* (2013.01)

(58) Field of Classification Search
CPC ....... H01L 2251/5338; H01L 2251/558; H01L 27/3244; H01L 27/3258; H01L 51/0097;
(Continued)

(56) References Cited

U.S. PATENT DOCUMENTS

| 4,112,365 A | 9/1978 | Larson et al. |
| 4,608,926 A | 9/1986 | Stevens |

(Continued)

FOREIGN PATENT DOCUMENTS

| CN | 101136605 | 3/2008 |
| CN | 100542007 | 9/2009 |

(Continued)

OTHER PUBLICATIONS

Zhu et al., "Design Considerations of Fault-Tolerant Electromechanical Actuator Systems for More Electric Aircraft (MEA)," IEEE, 2008 7 pages.

(Continued)

*Primary Examiner* — Zoheb S Imtiaz
(74) *Attorney, Agent, or Firm* — Hogan Lovells US LLP

(57) ABSTRACT

A representative fault-tolerant rotating electromechanical actuator comprises a permanent magnet synchronous motor with first and second windings that each comprise three phases. First and second voltage source inverters (VSI) provide output signals independently with respect to each other. The first VSI provides output signals to drive the three phases of the first winding, and the second VSI provides output signals to drive the three phases of the second winding. The three phases of the first winding are driven simultaneously with the three phases of the second winding. Control electronics monitor signals associated with the three phases of the windings and detect a fault condition within a first phase of the first winding. The control electronics command the first VSI to drive only second and third phases of the first winding while simultaneously commanding the second VSI to drive the three phases of the second winding.

19 Claims, 11 Drawing Sheets

(58) Field of Classification Search
CPC ............ H01L 51/5246; H01L 51/5253; H01L 2251/105; H01L 27/3276; H01L 51/5237; H01L 51/5256; H01L 27/32; H01L 51/00; H01L 51/52; Y02E 10/549; Y02P 70/50; G09F 9/301; H02K 1/278; H02K 11/33; H02K 16/04; H02K 21/14; H02K 2213/03; H02K 2213/06; H02K 3/28; H02K 1/27; H02P 25/22; H02P 6/08
USPC ........................................................ 318/495
See application file for complete search history.

(56) References Cited

U.S. PATENT DOCUMENTS

| | | | |
|---|---|---|---|
| 5,372,071 | A | 12/1994 | Richards |
| 5,898,123 | A | 4/1999 | Fritz et al. |
| 7,659,686 | B2 | 2/2010 | Osada et al. |
| 7,710,081 | B2 | 5/2010 | Saban et al. |
| 7,957,942 | B2 | 6/2011 | Ivchenko et al. |
| 8,695,473 | B2 | 4/2014 | Kametz |
| 8,727,654 | B2 | 5/2014 | Graham |
| 9,484,852 | B2 | 11/2016 | Timmons et al. |
| 10,205,416 | B2* | 2/2019 | Furukawa ............... H02P 29/00 |
| 10,328,970 | B2* | 6/2019 | Keum ................... H02P 29/024 |
| 11,467,003 | B1 | 10/2022 | Parodi |
| 2003/0102862 | A1 | 6/2003 | Goto et al. |
| 2006/0250042 | A1* | 11/2006 | Neet ....................... H02K 19/18 310/12.01 |
| 2017/0047728 | A1* | 2/2017 | Benarous ................ H02P 27/06 |
| 2018/0056793 | A1 | 3/2018 | Rozman |
| 2022/0388695 | A1 | 12/2022 | Patty |
| 2023/0003555 | A1 | 1/2023 | Parodi |

FOREIGN PATENT DOCUMENTS

| | | | |
|---|---|---|---|
| CN | 102132483 | | 7/2011 |
| CN | 103580584 | | 2/2014 |
| CN | 104160612 | * 11/2014 | ............. H02P 21/02 |
| CN | 105763116 | | 5/2019 |
| EP | 3131198 A1 | * 2/2017 | ............. H02H 3/023 |
| EP | 2412091 | | 8/2018 |
| WO | WO-2016003807 | | 1/2016 |

OTHER PUBLICATIONS

Recalde, Raul Igmar Gregor, "The Asymmetrical Dual Three-Phase Induction Machine and the MBPC in the Speed Control," InTech Open Science, Open Minds, Chapter 16, 2012, 16 pages.

Demir et al., "A Novel Dual Three-Phase Permanent Magnet Sychronous Motor with Asymmetric Stator Winding," IEEE Transactions on Magnetics, vol. 52, No. 7, Jul. 2016, 5 pages.

Giangrande et al., "Design of Fault-Tolerant Dual Three-Phase Winding PMSM for Helicopter Landing Gear EMA," https://www.researchgate.net/publication/328848285, Nov. 2018, 6 pages.

* cited by examiner

| Ref. torque for winding #1 | Ref. torque for winding #2 | Ref. current $i_{q1}^*$ | Ref. current $i_{q2}^*$ | Ref. current sums | | Ref. current differences | | Number of functional phases in stator windings | |
|---|---|---|---|---|---|---|---|---|---|
| | | | | $i_{d1}^* + i_{d2}^*$ | $i_{q1}^* + i_{q2}^*$ | $i_{d1}^* - i_{d2}^*$ | $i_{q1}^* - i_{q2}^*$ | $A_1$-$B_1$-$C_1$ | $A_2$-$B_2$-$C_2$ |
| $T_e^*/2$ | $T_e^*/2$ | $i_q^*/2$ | $i_q^*/2$ | 0 | $i_q^*$ | 0 | 0 | 3 | 3 |
| $T_e^*/3$ | $2T_e^*/3$ | $i_q^*/3$ | $2i_q^*/3$ | 0 | $i_q^*$ | 0 | $-i_q^*/3$ | 2 | 3 |
| 0 | $T_e^*$ | 0 | $i_q^*$ | 0 | $i_q^*$ | 0 | $-i_q^*$ | 0 or 1 | 3 |
| $2T_e^*/3$ | $T_e^*/3$ | $2i_q^*/3$ | $i_q^*/3$ | 0 | $i_q^*$ | 0 | $i_q^*/3$ | 3 | 2 |
| $T_e^*$ | 0 | $i_q^*$ | 0 | 0 | $i_q^*$ | 0 | $i_q^*$ | 3 | 0 or 1 |
| $T_e^*/3$ | $T_e^*/3$ | $i_q^*/3$ | $i_q^*/3$ | 0 | $2i_q^*/3$ | 0 | 0 | 2 | 2 |
| 0 | 0 | 0 | 0 | 0 | 0 | 0 | 0 | 2 | 0 or 1 |
| 0 | 0 | 0 | 0 | 0 | 0 | 0 | 0 | 0 or 1 | 2 |
| 0 | 0 | 0 | 0 | 0 | 0 | 0 | 0 | 0 or 1 | 0 or 1 |

LOW-VOLTAGE FAULT-TOLERANT ROTATING ELECTROMECHANICAL ACTUATORS, AND ASSOCIATED SYSTEMS AND METHODS

TECHNICAL FIELD

The present technology is directed to low-voltage fault-tolerant rotating electromechanical actuators and associated systems and methods. Particular embodiments are directed to operating permanent magnet synchronous motors within actuators that can be used in space, aerospace and/or other high-risk applications, and associated systems and methods for controlling the motors.

BACKGROUND

Many industrial applications employ a simplex or single-wound motor. However, for applications such as space and aerospace redundancy, high reliability is required, as a failure of the winding on a simplex motor can result in catastrophic system failure.

Motors with duplex, or dual-windings, are available and are typically operated in an active-standby mode. Generally, in an active-standby mode, one winding is operated while the other winding is in a standby mode. The first winding can be operated until a point of failure occurs with the winding or associated electronics, at which time the first winding is deactivated and the second winding is activated. This allows for the second winding to provide a back-up function for the first winding. However, switching over from one winding to the other causes a high level of stress on the electronic components and results in one or more cycles in which the motor is not operating and/or not under control.

On the other hand, if the dual-windings are operated simultaneously, which can be referred to as an active-active mode, there is an inherent mutual inductance (e.g., electromagnetic coupling) between the windings, which can interfere with the operation of the motor. Accordingly, there remains a need for efficient, redundant motors.

BRIEF DESCRIPTION OF THE DRAWINGS

FIG. 11 is a look-up table used by the torque/current sharing block formed in accordance with representative embodiments of the present technology.

DETAILED DESCRIPTION

Figure 1:
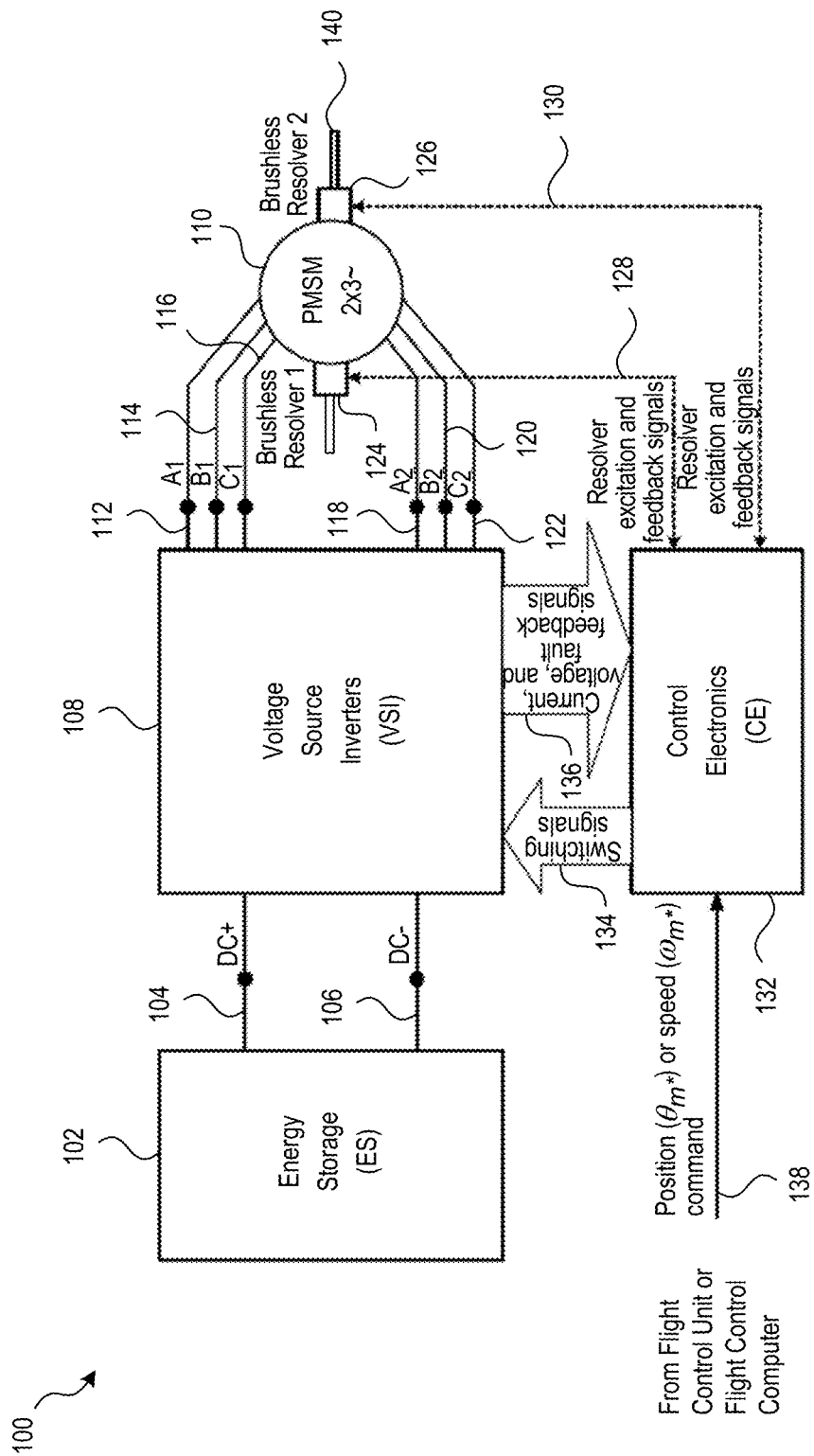
FIG. 1 schematically illustrates a fault-tolerant low-voltage rotating electromechanical actuator that can operate in a speed or position (servo) controlled mode, in accordance with embodiments of the present technology.

Embodiments of the present technology include an architecture, apparatus, and method of operation of fault-tolerant low-voltage rotating electromechanical actuators that can operate in a speed or position (servo) controlled mode. The actuator can include a permanent magnet synchronous motor with two sets of three-phase windings operated simultaneously. In representative installations, a fault-tolerant low-voltage rotating electromechanical actuator of the present technology can be used in high-risk applications such as rocket-based fuel pumps, and other electromechanical actuation applications that are safety-critical (e.g., the system is not to experience periods where control is lost or significant jitter occurs.) Representative actuators can also be used in applications that require safety redundancy. The following description includes headings solely for the convenience of the reader. Any elements described under one heading may be combined with any elements described under any of the remaining headings.

In some embodiments, a fault-tolerant rotating electromechanical actuator can comprise a three-phase permanent magnet synchronous motor with a dual-wound stator, two three-phase voltage source inverters, and control electronics. The stator can have distributed windings, arranged in star connection with separate neutral points, wound either in parallel or with an angular displacement. The two voltage source inverters can be independent, run simultaneously, and each of them powers a three-phase stator winding of the motor. The control electronics entity can run a closed position and/or speed loop on the motor while producing torques with motor windings and sharing the shaft's mechanical load. The control electronics can be configured to monitor for and detect faults on the windings (through associated signals) and turn off the faulty phases or entire winding while derating or maintaining the motor torque and keeping the speed or position controllable and stable.

In further embodiments, the fault-tolerant rotating electromechanical actuator can have the control electronics further configured to detect faults on the windings and power electronics and turn off faulty phases or entire windings. In this way, the control electronics can enable equal torque and current sharing between the motor windings under normal conditions or redistribute the load and currents under faulty conditions between the non-faulted phases. The control electronics allow the electromechanical actuator to continue operating with the derated torque in the closed-loop speed or position control upon having one fault on each winding. Additionally, once two or more faults get detected on a winding and its associated voltage source inverter, the control electronics can deactivate the inverter and the winding and continue operating speed and position control loops with derated torque on the remaining winding and inverter.

In still further embodiments, a representative fault-tolerant rotating electromechanical actuator can comprise a three-phase permanent magnet synchronous motor with a dual-wound stator, two independent three-phase voltage source inverters (VSI), and control electronics. The VSIs can be independent of each other, they can operate simultaneously, and each of them can power a three-phase stator winding of the motor. The control electronics entity can run a closed position and/or speed loop on the motor while producing torques with motor windings and sharing the shaft's mechanical load. The electronics can be configured to monitor for faults on the windings (through associated signals) and turn off the faulty phases or entire winding while derating or maintaining the motor torque and keeping the speed or position controllable and stable with the non-faulted windings. Through these actions, the actuator exhibits fault-tolerance to multiple faults.

Windings Active-Active

In some embodiments, a representative permanent magnet synchronous motor has two sets of three-phase windings. Both sets of three-phase windings are operated together (e.g., simultaneously) during normal operation, which can be referred to herein as "active-active". In contrast, when one set of motor windings is operated at a time, this operation can be referred to herein as "active-standby". In some embodiments, the windings are displaced by thirty degrees to each other, reducing (e.g., minimizing) some of the mutual inductance experienced when operating in active-active mode. In other embodiments, the windings can be displaced by values other than thirty degrees to each other, or even zero degrees.

The advantages of this operation include sharing the load (current/voltage) over both sets of windings, which can reduce the stress placed on the windings and/or other individual components, and thus each winding does not need to be sized to operate the load alone. Therefore, the windings and/or other components can be made smaller. Additional advantages can include turning off portions of one or both windings, or one entire winding, due to a malfunction within the winding and/or associated electronics without shutting down the motor.

Control Strategy

Control algorithms and electronics are provided to further reduce (e.g., minimize) mutual inductance effect by implementing a torque bias control algorithm/scheme. In at least some embodiments, the actuator implements four control loops—current, flux-weakening, speed, and position, to control the permanent magnet synchronous motor. The four control loops can run simultaneously and have at least some effect on each other. In addition to or instead of the foregoing advantages, other components (e.g., functioning windings, duplicate, back-up and/or slave components) can easily pick up the load during a malfunction, adjusting the voltage and current levels to operate the windings and components properly.

An advantage of the foregoing control strategies is that when a portion of a winding and/or components are faulty, the present technology experiences only a very slight degradation or jitter when removing the faulty component because the system does not remove power from the entire winding. In an active-standby system, jitter or transients can be experienced during the failure of one or more components as the standby (e.g., back-up) winding and/or components are brought on-line. In addition to or in lieu of the foregoing, loss of the motor's controllability (i.e., "blanking time") can be eliminated. Such blanking can otherwise be experienced when a winding has been lost, and the inactive winding is in the process of being activated, as when the two windings are operating in active-standby mode.

Low Voltage

In some embodiments, the permanent magnet synchronous motor is a low voltage motor with dual three-phase asymmetrical windings that utilize relatively high currents. By operating at a low voltage, the motor can be used in partial vacuum conditions without arcing and/or creating a corona discharge. At low operating voltage levels, the need to pressure seal the box in which the motor and associated electronics are housed can be reduced and/or eliminated. Another advantage is that windings and/or other components experience less stress due to the lower current and voltage levels they handle.

As used herein, the term "low voltage" can include voltage levels up to approximately 50 V. In some embodiments, the motor can have a low voltage combined with over 1 KW of power. In at least one embodiment, the motor can be designed for a rated voltage of 28 V dc (19.8 $V_{rms}$ terminal voltage) and mechanical power of 3.34 kW. The rated motor speed can be 4000 rpm, while the maximum speed can be 6000 rpm. The rated current per winding can be 142 $A_{rms}$, while the rated motor current can be 284 $A_{rms}$.

FIG. 1 illustrates a fault-tolerant low-voltage rotating electromechanical actuator 100 that can operate in a speed-controlled mode or a position-controlled (servo) mode in accordance with embodiments of the present technology. FIG. 1 provides a general overview of the actuator 100, which is discussed in further detail below. In some embodiments, the functions and components of the actuator 100 are provided within a single housing, while in other embodiments, the functions and components of the actuator 100 are positioned within multiple housings that are located within proximity to each other.

The actuator 100 can include an energy storage device 102 configured to provide a positive DC voltage via a positive terminal 104 and a negative (return) terminal 106 to voltage source inverters 108. The energy storage device 102 and voltage source inverters 108 are discussed further below with reference to at least FIGS. 2 and 3, respectively. The actuator 100 can operate at human-safe voltages, such as those below 50 V, and with motor line currents up to 400 A. Other voltage and motor line currents can be used in other embodiments.

The voltage source inverters 108 produce voltages that power the windings of a permanent magnet synchronous motor 110. The motor 110 has dual (two) three-phase symmetrical stator windings. Output voltages 112, 114, 116 drive the first set of three-phase windings of the motor 110, and output voltages 118, 120, 122 drive the second set of three-phase windings of the motor 110. Three-phase voltages 112, 114, 116 of the first VSI can be mutually displaced by thirty electrical degrees to the corresponding three-phase voltages 118, 120, 122 of the second VSI. The first and second VSIs 300, 302 are discussed below in connection with FIG. 3.

The motor 110 has first and second brushless resolvers 124, 126 on opposite sides of its shaft 140. Resolver excitation and feedback signals 128, 130 are communicated between the brushless resolvers 124, 126, respectively, and a set of control electronics 132. The control electronics 132 and the voltage source inverters 108 communicate various control and feedback signals, indicated as switching signals 134 and feedback signals 136, while also considering the position and/or speed command signals 138. The position and/or speed command signals are transmitted from a flight control unit or flight control computer (not shown).

The actuator 100 has a high level of reliability. It is tolerant of multiple faults that can occur within the energy storage device 102, the voltage source inverters 108, the motor windings, the resolvers 124, 126, various feedback sensors, and/or the control electronics 132. The actuator 100 is suitable for operation as an active-active system, wherein both sets of three-phase windings in the motor 110 are active at the same time. Accordingly, a fault in the actuator 100 (e.g., any fault) appears as graceful performance degradation, which allows the actuator 100 to complete its operating cycle successfully. In addition, the actuator 100 provides advantages such as a lower current stress rating on voltage source inverter power switches, low torque pulsations in the motor torque, and/or increased motor efficiency.

The actuator 100 normally operates both stator windings of the motor 110 simultaneously while reducing (e.g., minimizing) unwanted effects of the electromagnetic coupling between the windings. If a phase within a three-phase winding becomes disabled, the actuator 100 continues to operate the motor 110 by utilizing all three phases on the other (healthy) stator winding, along with the remaining two healthy phases on the faulty winding. If a winding has faults on more than one phase, the entire winding can be shut down, and the actuator 100 operates the motor 110 on the remaining healthy winding.

In general, there are two types of faulty winding phases open or short. The winding phase can become open if there is a failure/disconnect in the motor harness such that a phase of the stator winding becomes disconnected from the corresponding half-bridge in the voltage source inverter 108. Alternatively, if the power switches within a half-bridge of the voltage source inverter 108 fail open and no voltage/current is supplied to the motor winding phase, the phase is also considered open. In any case, an open phase is characterized by zero phase current (e.g., absence of current flow). The winding phase can be short-circuited if the terminals of two or more winding phases are connected. The winding can become shorted due to debris in the motor harness or when power switches of voltage source inverter half-bridges fail short (e.g., two switches in upper or lower parts of the half-bridges). The shorted phases are characterized by zero voltage between the phases.

In at least one embodiment, in a scenario where each winding has a faulty phase, the actuator 100 can continue operating the motor 110 with two two-phase windings, providing the faulted phases in each winding are not mutually displaced by thirty electrical degrees. For example, $A_1$ and $A_2$, which are mutually displaced by thirty electrical degrees, cannot both be faulty. Similarly, $B_1$ and $B_2$, or $C_1$ and $C_2$ cannot both be faulty.

If the motor has two faulty phases that coincide (e.g., when the windings are wound in parallel, without displacement), or that are mutually displaced by thirty electrical degrees (e.g., when the windings are wound with a displacement), the motor becomes unstable (e.g., both windings lose the symmetry) and the resulting torque produced by the remaining two phases in each of the windings is pulsating, with oscillations that cannot be easily controlled to produce a high quality of motion (e.g., smooth speed or position operation). Therefore, the displacement helps to minimize the effect of mutual inductance (coupling) between two windings, because the windings share the same stator slots either partially (e.g., if wound with displacement) or entirely (e.g., if parallel-wound, with zero displacement). The parallel wound windings have the highest coupling effect (mutual inductance), while the 30 electrical degrees displacement gives minimal mutual inductance.

Even though the displacement of thirty electrical degrees helps to reduce (e.g., minimize) the effect of electromagnetic coupling (mutual inductance) between the two three-phase windings, in some embodiments the control electronics 132 and the associated control scheme are capable of controlling the motor 110 with dual three-phase windings that have an arbitrary angular displacement between the two windings (including parallel windings with zero electrical degrees displacement). The displacement between windings (e.g., denoted in Figures and equations as angle gamma γ) is factored into direct Park transform blocks 906, 908 (FIG. 9) and inverse Park transform blocks 918, 920 (FIG. 9) that are part of the control algorithm/scheme discussed herein.

Figures 2A, 2B:
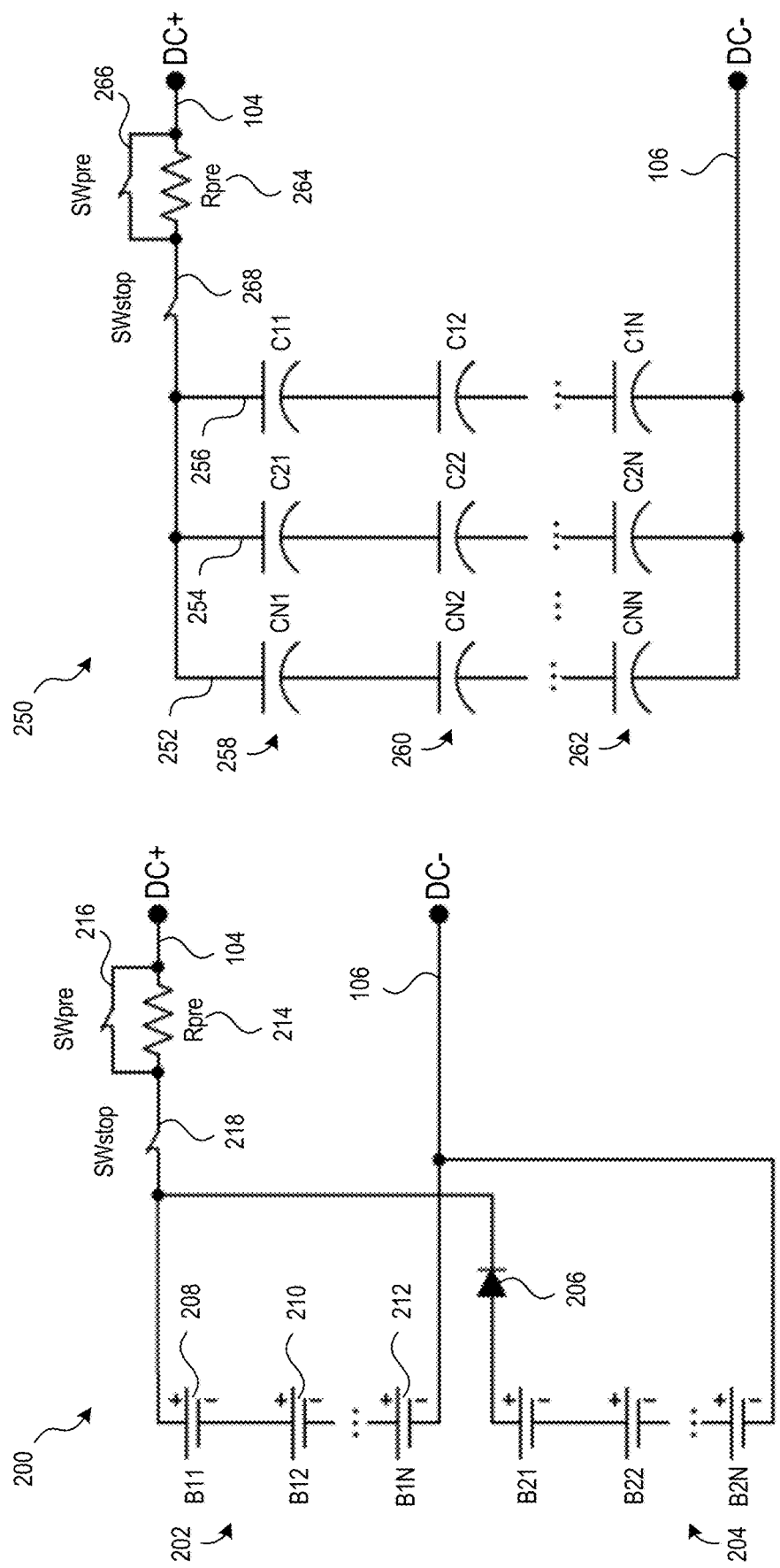
FIGS. 2A and 2B schematically illustrate energy storage devices within the actuator of FIG. 1, in accordance with embodiments of the present technology.

FIGS. 2A and 2B illustrate representative energy storage devices within the actuator 100 (FIG. 1) configured according to the present technology's embodiments. Energy storage devices 200, 250 correspond to the energy storage device 102 (FIG. 1) and can include interconnected electrochemical batteries, ultracapacitors (supercapacitors), and/or other suitable energy storage components.

In some embodiments, as shown in FIG. 2A, the energy storage device 200 can be battery-based, including first and second batteries 202, 204, and a power diode 206. Each of the first and second batteries 202, 204 can include a string of cells, such that the number of cells in a string is determined by the cell rated voltage and the highest positive DC voltage on positive terminal 104 that is required at the input of the voltage source inverters 108 (FIG. 1). In at least one embodiment, the first battery 202 includes the plurality of cells 208, 210, 212. In another embodiment, more or fewer than three cells are used for the first battery 202 and/or the second battery 204.

FIG. 2B illustrates an ultracapacitor bank-based energy storage device 250. The energy storage device 250 can include two or more parallel strings 252, 254, 256 of ultracapacitor cells. Each of the first, second, and third strings 252, 254, 256 can include a plurality of serially connected ultracapacitor cells, such as three ultracapacitor cells 258, 260, 262 shown in the first string 252. The number of cells in a string can be determined by the cell rated voltage and the highest positive DC voltage required at the input of the voltage source inverters 108 (positive terminal 104 of FIG. 1). The number of parallel ultracapacitor strings 252, 254, 256, and cells can be determined by actuator 100 required duty cycle power and duration. Advantages of placing the strings 252, 254, 256 of capacitors in parallel can include fault redundancy and/or low equivalent series resistance (and hence lower ripple current losses).

Referring to FIGS. 2A and 2B, each of the energy storage devices 200, 250 has a pre-charge resistor ($R_{pre}$) 214, 264, respectively, arranged in parallel with a pre-charge contactor or switch ($SW_{pre}$) 216, 266, respectively, that is closed when the motor 110 (see FIG. 1) is running. An enable/disable contactor switch ($SW_{stop}$) 218, 268, respectively, allows the control electronics 132 (FIG. 1) to power or remove power from the motor 110. The primary purpose of the contactor switch 218, 268, is to prevent the power electronics from powering the motor 110, by removing the access to the energy storage device 200, 250. In some embodiments, the pre-charge switches ($SW_{pre}$) 216, 266, and the enable/disable contactor switches 218, 268 can be mechanical contactors or solid-state semiconductor switches that are controlled by real-time controllers.

A benefit of using a low voltage for the overall DC voltage of the energy storage devices 200, 250 is more efficient (e.g., optimal) sizing of the energy storage device for a specific application, where size can refer to the number of cells, mass, and/or volume. For example, mass and volume can refer to the cells' total mass and volume, and consequently, the entire energy storage device 200, 250. In some embodiments, the low voltage is a voltage below 50 V. In other embodiments, low voltage allows for smaller and/or more compact and lightweight configurations compared to configurations that support high voltage applications. In addition to or in place of the foregoing advantages, voltages below 50 V are generally safe for humans. They do not require additional safety measures to be implemented in the electrical systems. Other advantages of using a low voltage for near-vacuum applications include preventing undesired events such as corona discharge and/or arcing.

Figure 3:
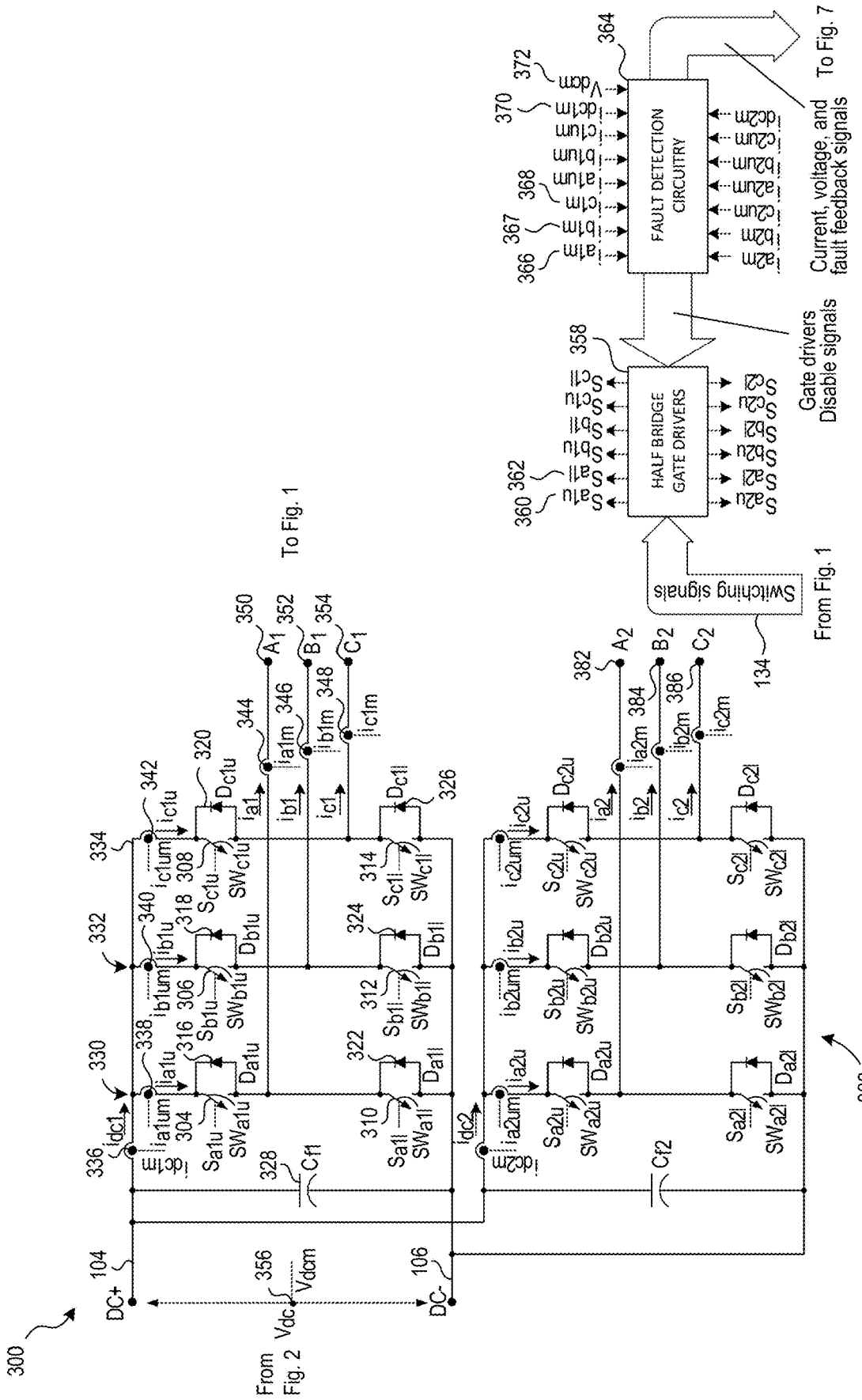
FIG. 3 schematically illustrates voltage source inverters within the actuator of FIG. 1, configured in accordance with embodiments of the present technology.

FIG. 3 illustrates representative voltage source inverters configured in accordance with embodiments of the present technology. First and second three-phase two-level voltage source inverters (VSI) 300, 302 that can be included within the voltage source inverter 108 (FIG. 1) for the actuator 100 (FIG. 1) are shown. The components of the first and second VSIs 300, 302 are the same or nearly the same, and thus the following discussion of the first VSI 300 can apply as well to the second VSI 302.

The first VSI 300 can include six controlled power switches 304, 306, 308, 310, 312, 314 and six antiparallel power diodes 316, 318, 320, 322, 324, 326. A DC bus capacitor filter bank $C_{f1}$ 328 is connected between the positive terminal 104 and return terminal 106.

Any two serially connected power switches with their antiparallel diodes, such as power switches 304, 310, and antiparallel diodes 316, 322, form one inverter leg or half-bridge 330, 332, 334. In some embodiments, power switches 304-314 can be N-channel Metal Oxide Semiconductor Field Effect Transistors (MOSFETs) and/or N-channel Insulated Gate Bipolar Transistors (IGBTs) based on silicon (Si), gallium nitride (GaN), and/or silicon carbide (SiC). In other embodiments, if the power switches 304-314 are required to conduct currents above the rated values for MOSFETs and/or IGBTs, the power switches 304-314 can be constructed by configuring two or more MOSFETs and/or IGBTs in parallel.

The representative first VSI 300 has seven current sensors. One current sensor 336 is located at the DC input of the first VSI 300, three current sensors 338, 340, 342 are located in the upper parts of inverter legs of half-bridges 330, 332, 334, and three current sensors 344, 346, 348 are located at the inverter AC outputs 350, 352, 354. The inverter AC outputs 350, 352, 354 feed the first output signals 112, 114, 116 (FIG. 1), respectively, and each of the first output signals 112, 114, 116 feeds one of the phases of one of the windings of the motor 110 (FIG. 1). In some embodiments, the current sensors 336-348 can be resistive shunts and/or Hall-effect-based sensors. Additionally, the VSIs 300, 302 can include a voltage sensor 356 for measuring the DC bus voltage ($v_{dc}$) value.

Turning to the representative second VSI 302, inverter AC outputs 382, 384, 386 feed the second output signals 118, 120, 122 (FIG. 1), respectively. Each of the second output signals 118, 120, 122 feeds one of the phases of a second winding of the motor 100.

The first and second VSIs 300, 302 each have gate drivers circuitry 358 with corresponding DC/DC power supplies (not shown). The gate drivers circuitry 358 transmits switching signals 134 from the control electronics 132 (FIG. 1) to the gates of corresponding power switches 304-316. For example, switching signals 360, 362 are transmitted to power switches 304, 310, respectively. The gate drivers circuitry 358 further functions as signal power amplifiers by providing sourcing and sinking (e.g., turn on and turn off) currents for power switches 304-314 and provides galvanic isolation (e.g., optical, magnetic, and/or capacitive) between the control electronics 132 and the inverter power switches 304-314.

The following description of the fault detection circuitry 364 discusses some of the conditions under which a phase of a winding and/or an entire winding can be determined to be faulty and thus disabled. Other associated components can also be faulty, impacting phase (or entire winding) ability to operate correctly.

The fault detection circuitry 364 takes current and voltage signals from both VSIs 300, 302 and compares the signals to predefined levels and/or ranges to determine if a fault condition is triggered. For example, in some embodiments, current signals 366, 367, 368, 370 correspond to signals detected by current sensors 344, 346, 348, 336, respectively, and voltage signal 372 corresponds to the signal detected by the voltage sensor 356. If a fault condition is triggered, one or more gate drivers are disabled, opening the corresponding power switch 304-314. Therefore, to disable a winding phase, the associated power switch within the voltage source inverter is commanded to be open.

The fault detection circuitry 364 can detect several types of faults (e.g., voltages and/or currents above and/or below predetermined thresholds or levels, or outside of predetermined ranges). The detectable motor and inverter faults comprise overvoltage, undervoltage, motor phase overcurrent, motor phase open, inverter or motor phase short to ground, and inverter or motor phase line-to-line short. To detect faults, the fault detection circuitry 364 measures stator line/phase currents in both windings ($i_{a1}$, $i_{b1}$, $i_{c1}$, $i_{b2}$, $i_{c2}$), DC bus input currents ($i_{dc1}$, $i_{dc2}$), DC bus voltage ($v_{dc}$), and currents in the upper half-bridges of each voltage source inverter ($i_{a1u}$, $i_{b1u}$, $i_{c1u}$, $i_{a2u}$, $i_{b2u}$, $i_{c2u}$) In some embodiments, the phase currents are measured before the power switches 304, 306, 308 in the upper half-bridges 330, 332, 334 of the first VSI 300, and between the outputs of first and second VSIs 300, 302 and motor phase terminals.

The detection of a fault can potentially shut down one or more of the gate drivers within the half-bridge gate drivers circuitry 358, thus shutting down one or more inverters or half-bridges 330, 332, 334. As a result, an associated phase of a winding (or more than one phase) can be shut down. In some cases, one or both VSIs 300, 302 are shut down, resulting in the shutdown of one or both windings. Some of the detectable faults and the resultant response thereto are:

Overvoltage disables both VSIs 300, 302 (DC bus voltage at voltage sensor 356 is higher than a predetermined/safe value).

Undervoltage disables both VSIs 300, 302 (DC bus voltage at voltage sensor 356 is lower than a predetermined/safe value).

Motor phase overcurrent disables a single phase of the corresponding VSI 300, 302 (absolute value of motor phase current is higher than a predetermined safe value).

Motor phase open disables a single phase of the corresponding VSI 300, 302 (absolute value of motor phase current and current in the corresponding inverter's upper half-bridge 330, 332, 334 are zero).

Inverter or motor phase short to ground disables a single phase of a corresponding VSI 300, 302 (DC bus current and current in one of the upper half-bridges 330, 332, 334 is higher than a predetermined/safe value).

Inverter or motor phase line-to-line short disables an entire VSI 300, 302 (DC bus current and two or more currents in the upper half-bridges are higher than a predetermined/safe value).

Figure 4:
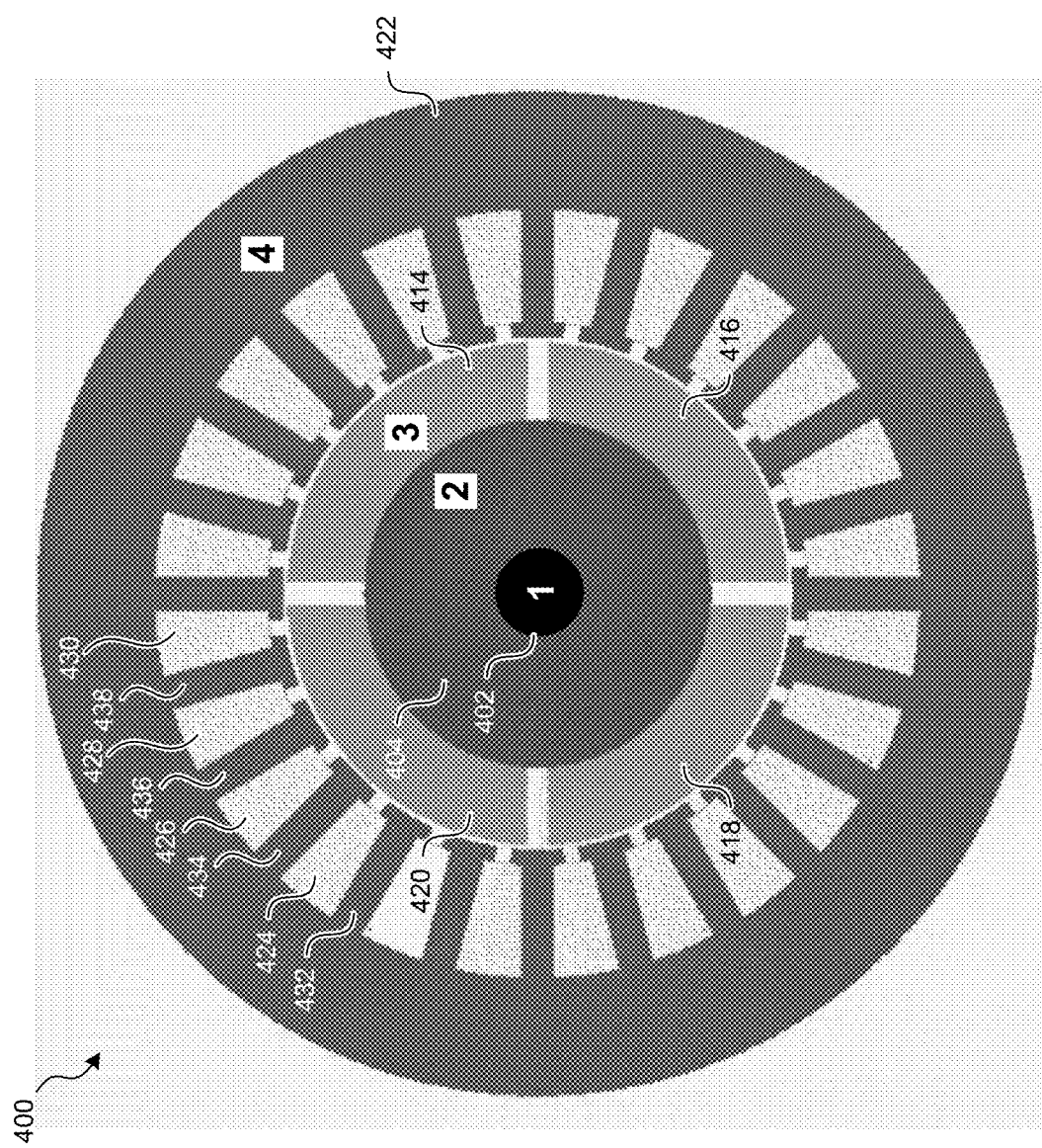
FIG. 4 illustrates an example cross-section of a permanent magnet synchronous motor with dual three-phase asymmetrical stator windings formed in accordance with embodiments of the present technology.

FIG. 4 illustrates an example of cross-section 400 of the motor 110 (FIG. 1) with dual three-phase asymmetrical stator windings formed in accordance with embodiments of the present technology. The cross-section 400 has a rotor shaft 402, a rotor 404, four rotor poles, four permanent surface magnets 414, 416, 418, 420, and a stator 422 with twenty-four stator slots. In some embodiments, the permanent surface magnets 414, 416, 418, 420 are four neodymium-iron-boron surface permanent magnets with a constant angle on the rotor 404 that form two (p=2) pole pairs.

The motor 110 can have a permanent magnet synchronous configuration with two identical three-phase windings on the stator 422 that are wye-connected and mutually spatially displaced by thirty electrical degrees (or $$\frac{\pi}{6}$$

electrical moans). The neutral points ($N_1$ and $N_2$) of each of the windings are physically separated and described later with reference to FIG. 5. The inner rotor 404 has a cylindrical shape and, in at least some embodiments, is built as a stack of laminated steel sheets. The rotor 404 also includes the permanent magnets 414, 416, 418, 420 that are placed either in or on the rotor 404 (e.g., at the interior of the rotor 404, at the surface of the rotor 404, and/or inset from the surface of the rotor 404), such that the permanent magnets 414, 416, 418, 420 form an even plurality (two or more) of magnetic poles. In some embodiments, the permanent magnets 414, 416, 418, 420 on the rotor 404 can be made of neodymium-iron-boron, samarium-cobalt, aluminum-nickel-cobalt, and/or strontium ferrite.

In some embodiments, the stator 422 of the motor 110 is designed as a stack of laminated steel sheets with a plurality of stator slots 424, 426, 428, 430 and teeth 432, 434, 436, 438 that are cut into each of the laminations. There are twenty-four stator slots and twenty-four teeth in the embodiment shown, although not all are indicated. In some embodiments, steel sheets used to construct the rotor 404 and the stator 422 are electrical steel sheets with 3.5-6.5% silicon (Si) and thickness anywhere between 0.01 and 2 mm.

In designing the motor 110 with dual three-phase asymmetrical stator windings, the following rules regarding pole and stator slot combination can be followed in at least some embodiments:

The pole number is an even number (2p), where p≥1 is the number of rotor pole pairs.

The number of pole pairs is not a multiple of the phase number n (n=6), leading to unbalanced windings.

The number of poles (2p) is not equal to the number of stator slots ($s_s$) 424-430 for distributed windings, as this would lead to undesired cogging torque in the motor 110 in addition to being a single-phase motor. However, for concentrated windings, the number of stator slots 424-430 can be equal to the number of poles.

The number of stator slots 424-430 is a multiple of the number of phases n (wherein n=6 for a dual three-phase motor).

In some embodiments, the stator slot/tooth geometry can have parallel teeth openings with arc, flat, or round bottoms, or the stator slot/tooth geometry can have straight teeth with arc, flat, or round bottoms. In some cases, round bottom assumes a special case of arc bottom with 180 degrees arc angle. In other embodiments, the geometry of the permanent magnets 414-420 on the rotor 404 can be any of the following combinations:

Interior magnets buried standard, spoke, buried standard with hexagon barrier, V-shaped (single or double layer), crescent-shaped, twin crescent-shaped, bisection (with single, double, or triple layer), and/or inverted triangle.

Surface and inset permanent magnets constant angle, constant width, constant spacing, constant width semicircular, and/or constant width with decay ("bread loaf").

The windings on the stator 422 can be characterized as distributed windings, either integer or fractional-slot (depending on the number of slots per pole per phase), that can be arranged in one or more layers, and with an arbitrary coil span that accommodates 120 electrical degrees displacement between phases and 30 electrical degrees displacement between windings. In general, the coil span defines across how many stator slots one coil spans. Depending on the electric motor stator's construction, the number of slots can vary from one design to another, and so can a coil span.

In some embodiments, the motor 110 is designed for a rated voltage of 28 VDC (19.8 $V_{rms}$ terminal voltage) and a mechanical power of 3.34 kW. The rated motor speed is 4000 rpm, and the maximum speed is 6000 rpm. The rated current per winding is 142 $A_{rms}$, while the rated motor current is 284 $A_{rms}$. For example, the 28 Vdc is a nominal low voltage value per military standard MIL-STD-704 for aerospace and space applications. Typical ranges for this voltage are 18-36 Vdc. In some embodiments of the present technology, electromechanical power of 0.1-10 kW can be delivered within this voltage range. Also, in some embodiments, the overall motor currents can range from 2 $A_{rms}$ (for 0.1 kW) to 400 $A_{rms}$ (for 10 kW), while the typical first and second winding line currents can be half of those amounts, assuming equal current sharing and active-active mode of operation.

Figure 5:
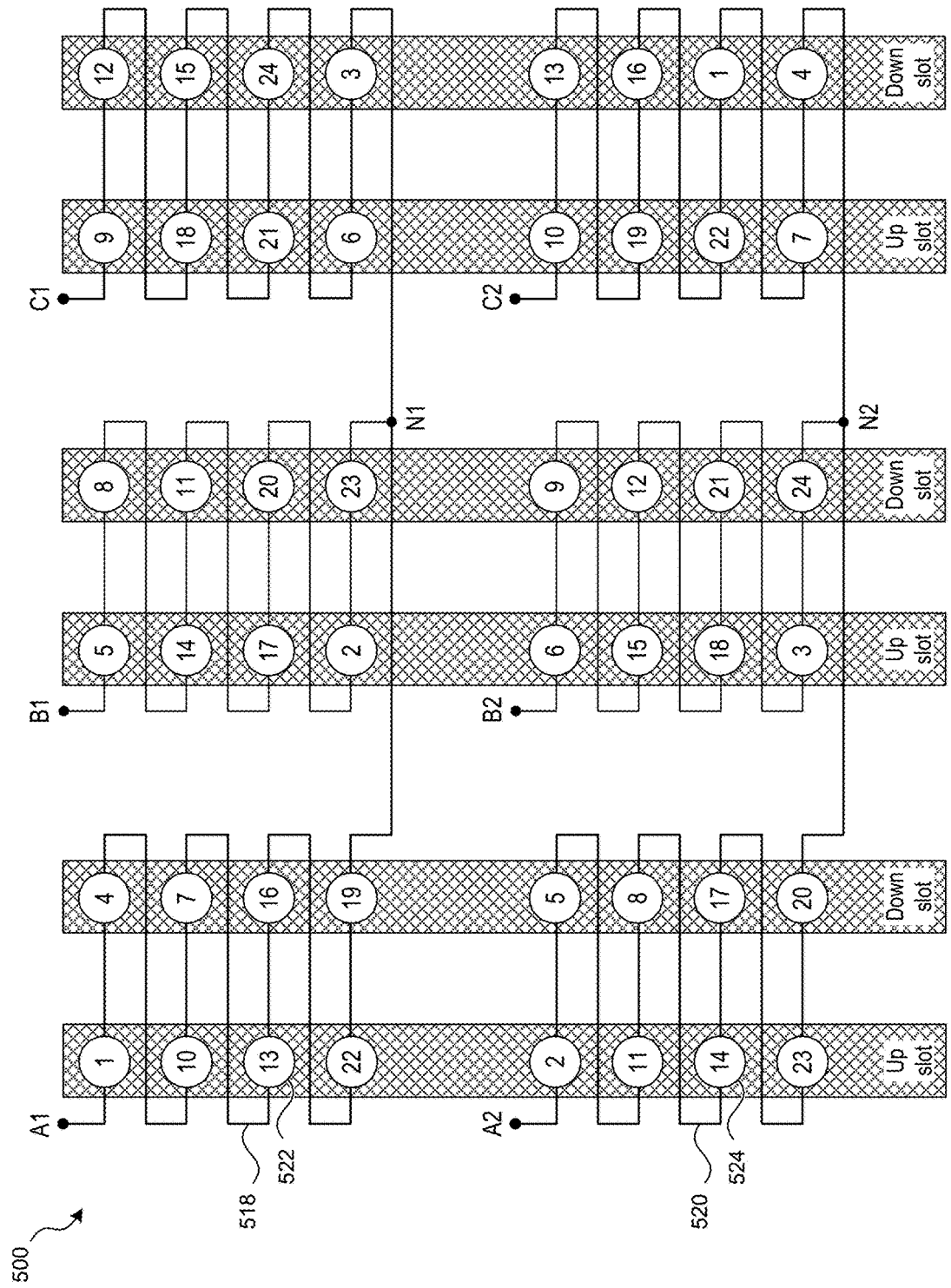
FIG. 5 illustrates a representative slot winding diagram of the permanent magnet synchronous motor of FIG. 4 with dual three-phase windings, four rotor poles, and twenty-four stator slots, formed in accordance with embodiments of the present technology.

FIG. 5 illustrates a slot winding diagram 500 of the motor 110 (FIGS. 1, 4) with dual three-phase windings, four rotor poles, and twenty-four stator slots formed in accordance with embodiments of the present technology. The winding diagram 500 shows first and second windings 518, 520 of the motor 110 with respect to the stator slots, which are indicated as circles 522, 524, respectively, with the stator slot number inside the circle. The first winding 518 has three phases $A_1$, $B_1$, and $C_1$ the second winding 520 has three phases $A_2$, $B_2$, and $C_2$, while the neutral points for the first and second windings 518, 520 are $N_1$ and $N_2$, respectively. The neutral points $N_1$ and $N_2$ are separate from each other.

As discussed previously with reference to FIG. 3, the three inverter AC outputs 350, 352, 354 feed the phases $A_1$, $B_1$, and $C_1$, respectively, of the first winding 518. The three additional inverter AC outputs 382, 384, 386 feed the phases $A_2$, $B_2$, and $C_2$, respectively, of the second winding 520.

Figure 6:
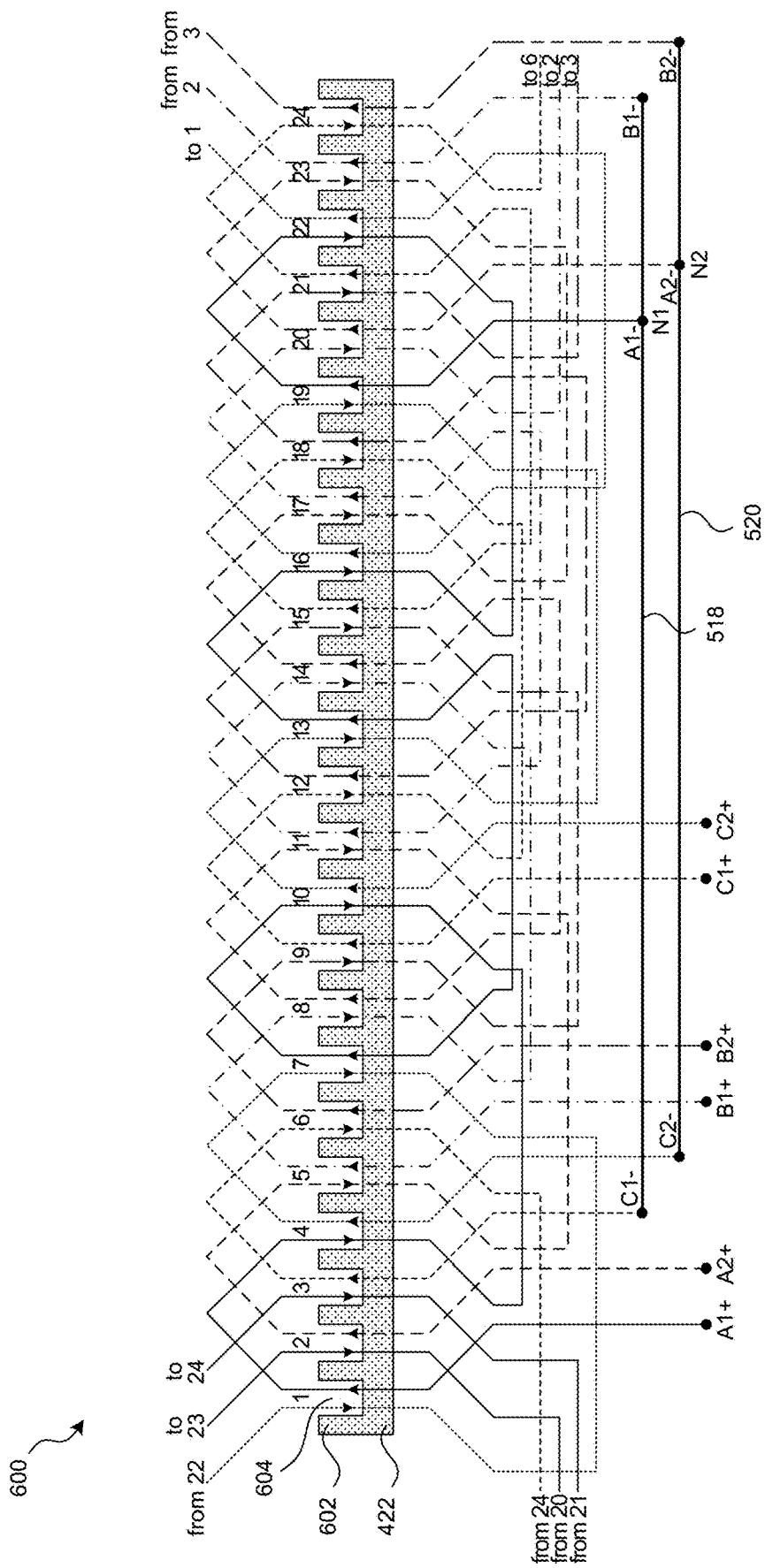
FIG. 6 illustrates representative spatial displacements of the motor windings and coils within the stator slots of the slot winding diagram of FIG. 5, in accordance with embodiments of the present technology.

FIG. 6 illustrates representative spatial displacements 600 of the motor windings and coils within the stator slots of the slot winding diagram 500 (FIG. 5), in accordance with embodiments of the present technology. The stator 422 with twenty-four stator teeth 602 and twenty-four stator slots 604 is shown. The first and second windings 518 and 520 and the first and second neutral points $N_1$ and $N_2$ are indicated.

As depicted in FIGS. 5 and 6, motor 110 (FIG. 1) has dual three-phase windings, four rotor poles, and twenty-four stator slots. In some embodiments, both motor windings 518 and 520 are distributed, single-layered, and have a coil span of 3 slots. In some embodiments, each winding 518 and 520 has 1.5 turns, and the windings 518 and 520 are characterized as integer or integral-slot windings since the number of slots per pole per phase is an integer number.

Figure 7:
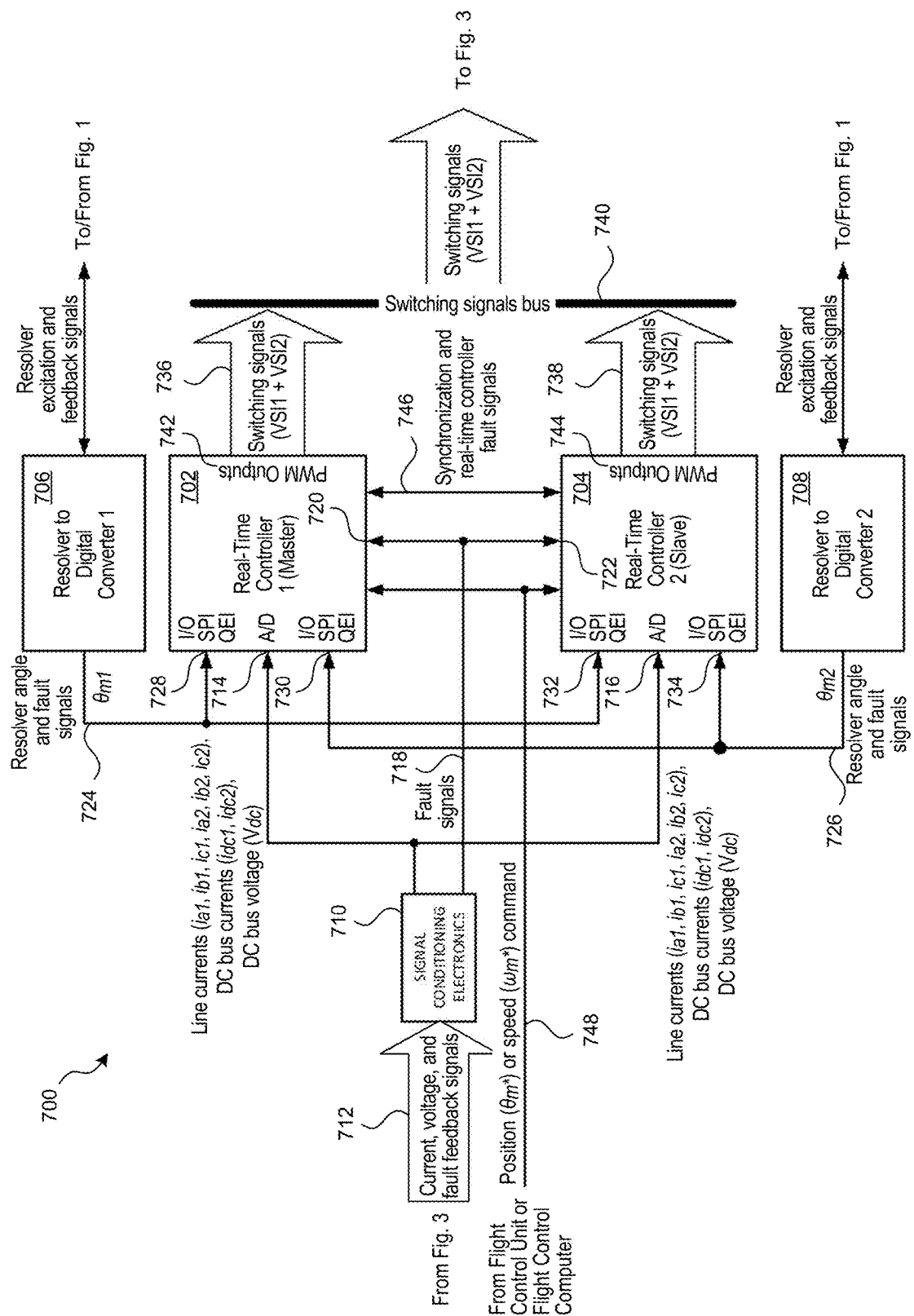
FIG. 7 illustrates a block diagram of a representative control electronics subsystem formed in accordance with embodiments of the present technology.

FIG. 7 illustrates a block diagram of a representative control electronics subsystem 700, formed in accordance with embodiments of the present technology, which can be incorporated into the control electronics 132 (FIG. 1). The control electronics subsystem 700 can include first and second real-time controllers 702, 704 (in some embodiments configured as a master and a slave), first and second resolver-to-digital converters 706, 708, and signal conditioning electronics 710. In some embodiments, each of the first and second real-time controllers 702, 704 can be implemented using a digital signal processor (DSP), a microcontroller, a complex programmable device (CPLD), a field-programmable gate array (FPGA), and/or a system on a chip (SoC, comprising a DSP and FPGA).

Current, voltage, and fault feedback signals 712 are fed from the first and second VSIs 300, 302 to the signal-conditioning electronics 710 of the control electronics subsystem 700. The signal-conditioning electronics 710 amplify and filter the current and voltage feedback signals, which are then fed to first and second analog-to-digital (A/D) converter inputs 714, 716 of the first and second real-time controllers 702, 704, respectively. Similarly, fault feedback signals 718 from the first and second VSIs 300, 302 are routed to general-purpose first and second input/output pins 720, 722 on the first and second real-time controllers 702, 704, respectively.

The first and second resolver-to-digital converters 706, 708 provide excitation for the first and second brushless resolvers 124, 126 (FIG. 1) on the motor 110 (FIG. 1). Additionally, the first and second resolver-to-digital converters 706, 708 provide demodulation of the rotor angular information of the stator windings quadrature voltages from the first and second brushless resolvers 124, 126, and convert the information to a digital word that is transferred to the first and second real-time controllers 702, 704. The digital information about the rotor angle from both the first and second brushless resolvers 124, 126 ($\theta_{m1}$ and $\theta_{m2}$, respectively) is indicated in FIG. 7 as first and second resolver angle and fault signals 724, 726 ($\theta_{m1}$ and $\theta_{m2}$, respectively), both of which are conveyed to both of the first and second real-time controllers 702, 704 via interfaces 728, 730, 732, 734, which in some embodiments can be a parallel interface, serial peripheral interface (SPI) and/or quadrature encoder interface (QEI). Additionally, all resolver faults can be detected, isolated, and reported back to the real-time controllers 702 and 704 through input/output (I/O) pin interfaces 728, 730, 732, 734.

The first and second real-time controllers 702, 704 run control algorithms that regulate the speed of the motor 110 and/or rotor angular position of the motor 110. In doing so, the first and second real-time controllers 702, 704 generate first and second switching signals 736, 738 that are propagated to the gate drivers circuitry 358 (FIG. 3) of the power switches 304-314 (FIG. 3) inside the first and second VSIs 300, 302. First and second switching signal pins 742, 744 on pulse width modulator (PWM) outputs of each of the first and second real-time controllers 702, 704 are tied to a common switching signals bus 740.

If the first real-time controller 702 is operating without faults, the first real-time controller 702 operates as a master and drives both VSIs 300 and 302. In this scenario, the second real-time controller 704 operates as a slave, and the second switching signal pins 744 are in a high-impedance state. During their operation, both first and second real-time controllers 702, 704 are synchronized using synchronization pulses and exchange information on faults via synchronization and fault signals 746.

If for some reason the first real-time controller 702 experiences one or more faults (e.g., component failure, voltage and/or current detected outside predetermined limits), the first switching signal pins 742 are commanded into a high-impedance state, while the second switching signal pins 744 on the second real-time controller 704 are activated. Now the second real-time controller 704 executes the control algorithms and thus regulates the position and/or speed of the motor 110. Position and/or speed commands 748 (e.g., from a Flight Control Unit or Flight Control Computer (not shown)) are transmitted either as analog or digital values to both of the first and second real-time controllers 702, 704 via any of the appropriate interfaces (e.g., A/D, UART, SPI, CAN, and/or other known interfaces) that are available in the first and second real-time controllers 702, 704.

In some embodiments, the motor 110 of the actuator 100 (FIG. 1) has two independent three-phase stator windings that are spatially displaced by an angle γ of thirty electrical degrees ( $$\frac{\pi}{6}$$

electrical raglans) and nave separate neutral points, as discussed previously. If both windings are balanced, symmetrical, and are excited with stator voltages of frequency $\omega_e$, the following expressions for the stator currents flowing in windings $A_1$-$B_1$-$C_1$ and $A_2$-$B_2$-$C_2$, respectively, apply, (where $I_{m1}$, $I_{m2}$ are magnitudes of currents in both windings, and $\varphi_1$, $\varphi_2$ are the respective current phase angles):

$$i_{a1} = I_{m1}\sin(\omega_e t + \varphi_1)$$

$$i_{b1} = I_{m1}\sin\left(\omega_e t + \varphi_1 - \frac{2\pi}{3}\right)$$

$$i_{c1} = I_{m1}\sin\left(\omega_e t + \varphi_1 + \frac{2\pi}{3}\right)$$

$$i_{a2} = I_{m2}\sin(\omega_e t + \varphi_2 - \gamma)$$

$$i_{b2} = I_{m2}\sin\left(\omega_e t + \varphi_2 - \frac{2\pi}{3} - \gamma\right)$$

$$i_{c2} = I_{m2}\sin\left(\omega_e t + \varphi_2 + \frac{2\pi}{3} - \gamma\right)$$

The currents in each winding can be described with a pair of complex space vectors, also known as polyphasors, that may have information about all three respective currents embedded in them. The polyphasors for each of the windings can be defined in such a way that they either preserve the information about currents' magnitudes:

$$\underline{i}_1 = \tfrac{2}{3}(i_{a1} + i_{b1}\underline{\alpha} + i_{c1}\underline{\alpha}^2)$$

$$\underline{i}_{s2} = \tfrac{2}{3}(i_{a2} + i_{b2}\underline{\alpha} + i_{c2}\underline{\alpha}^2)$$

or preserve the current-related power:

$$\underline{i}_{s1} = \sqrt{\frac{2}{3}}\,(i_{a1} + i_{b1}\underline{\alpha} + i_{c1}\underline{\alpha}^2)$$

-continued $$\underline{i}_2 = \sqrt{\frac{2}{3}}(i_{a2} + i_{b2}\underline{\alpha} + i_{c2}\underline{\alpha}^2)$$

where $\underline{\alpha} = e^{j2\pi/3}$ is a complex operator.

The above equations describe embodiments for which all the phases within the first and second windings are active. If one or more of the phases are not active, then the corresponding phase currents ($i_{a1}$, $i_{b1}$, $i_{c1}$, $i_{a2}$, $i_{b2}$, or $i_{c2}$) are zero.

Figure 8A:
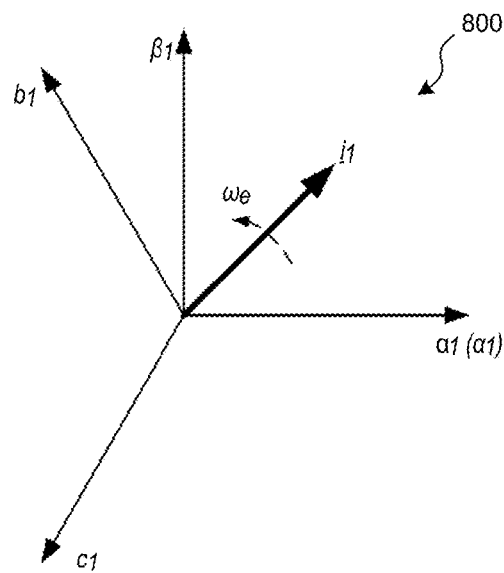
FIGS. 8A-8D illustrate representative polyphasor diagrams of stator currents for dual three-phase windings in accordance with embodiments of the present technology.
Figure 8B:
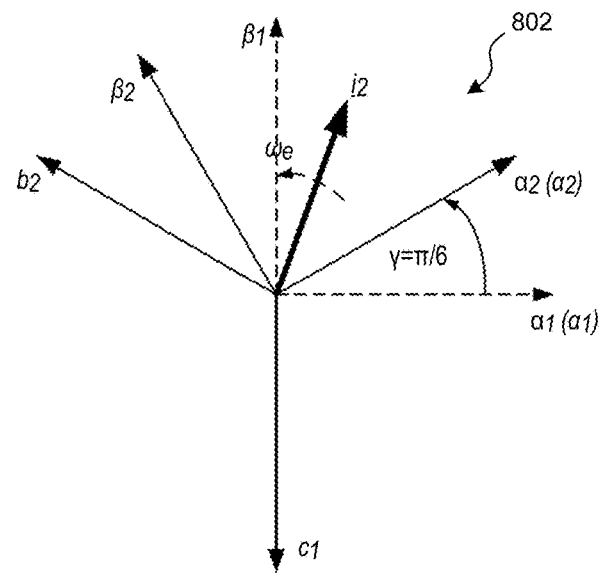
Figure 8C:
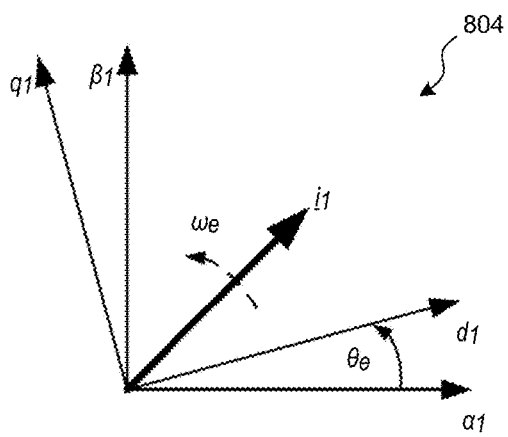
Figure 8D:
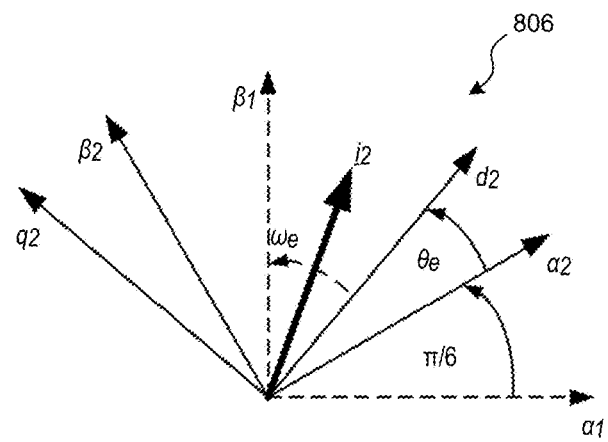

FIGS. 8A-8D illustrate polyphasor diagrams 800, 802, 804, 806 of stator currents for both windings ($\underline{i}_1$ and $\underline{i}_2$) per the embodiments of the present technology. FIGS. 8A and 8B depict current polyphasors in stationary three- and two-phase reference frames (three-phase: $a_1$-$b_1$-$c_1$ and $a_2$-$b_2$-$c_2$ and two-phase: $\alpha_1$-$\beta_1$ and $\alpha_2$-$\beta_2$). FIGS. 8C and 8D depict current polyphasors in synchronously rotating reference frames ($d_1$-$q_1$ and $d_2$-$q_2$). The angle between the $\alpha$-axis and d-axis is defined such that $$\omega_e = \frac{d\theta_e}{dt}.$$

Figure 9:
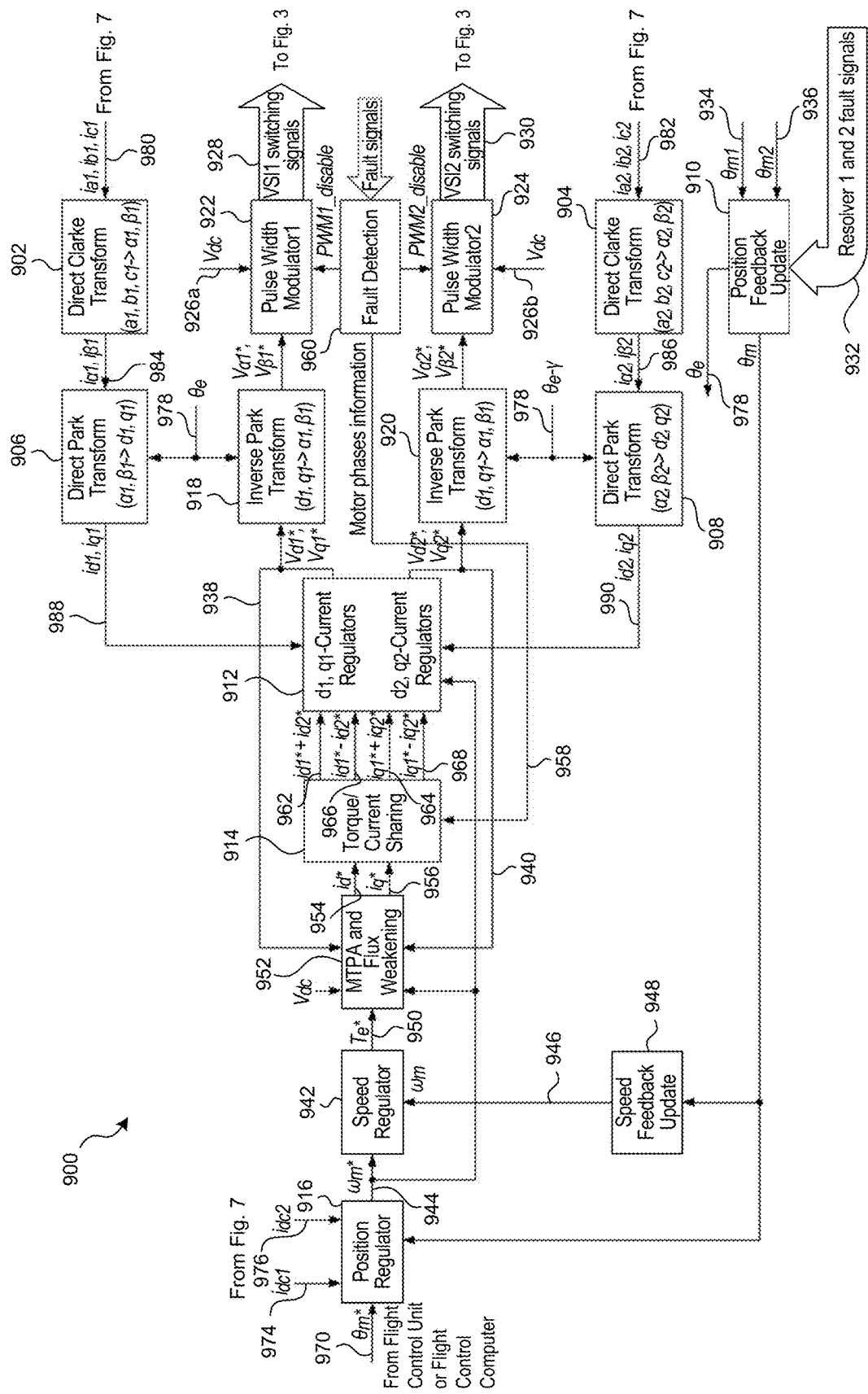
FIG. 9 illustrates a block diagram of a representative control algorithm that runs an actuator as a servo drive, in accordance with embodiments of the present technology.
Figure 10:
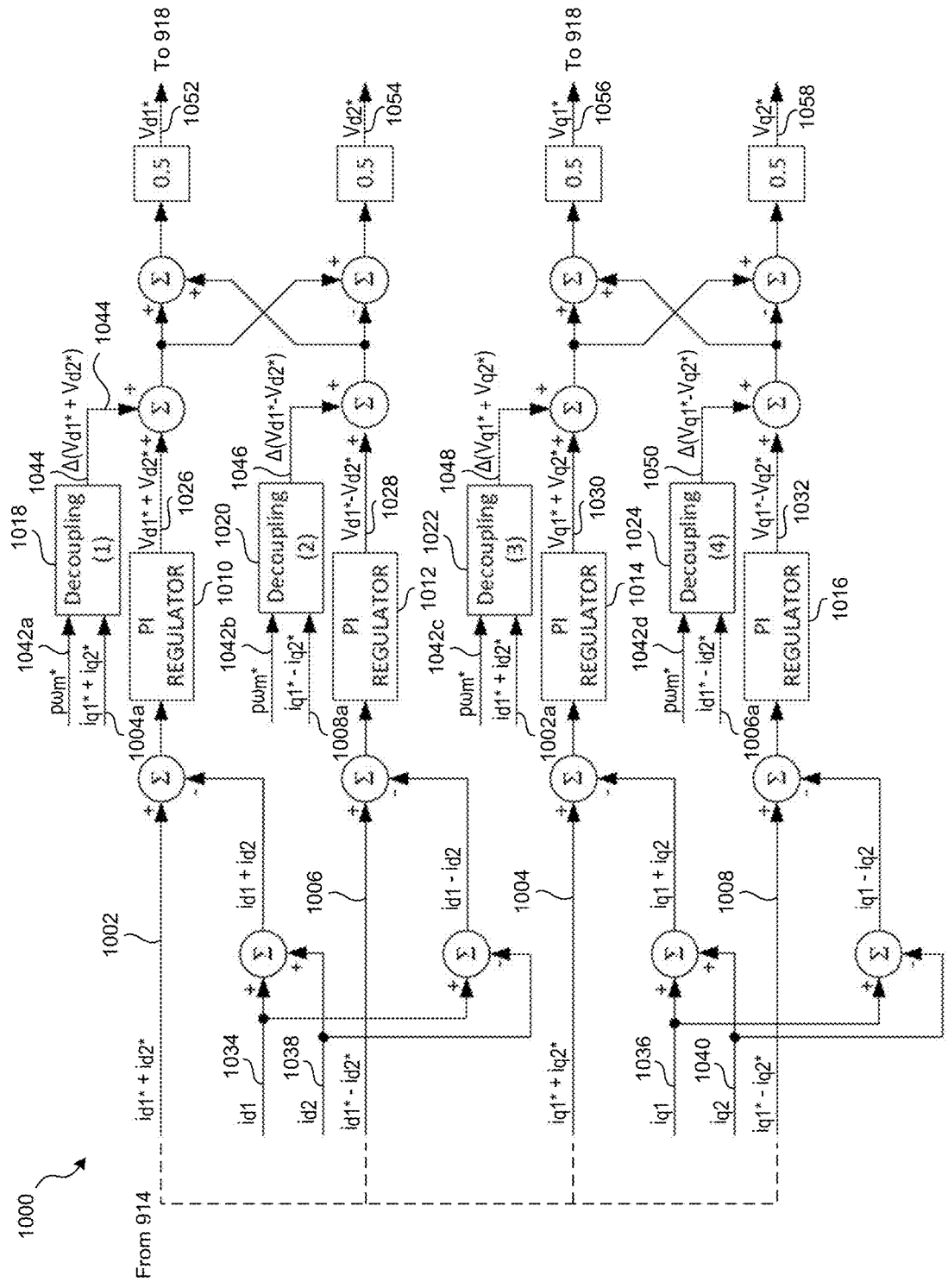
FIG. 10 is a block diagram illustrating the current regulators' algorithm/scheme, in accordance with embodiments of the present technology.

FIG. 9 illustrates a block diagram of a representative control algorithm 900 that runs the actuator 100 (FIG. 1) as a servo drive, in accordance with embodiments of the present technology. In some embodiments, the control algorithm 900 is running concurrently in both first and second real-time controllers 702, 704 (FIG. 7). However, initially, only the master controller (e.g., first real-time controller 702) is generating the PWM signals, output at first switching signal pins 742, that are driving the first and second VSIs 300, 302 (FIG. 3) on the switching signal bus 740 (FIG. 7). Suppose the master controller fails for some reason. In that case, the first switching signal pins 742 that are supplying the PWM signals go into high impedance mode, and the slave real-time controller (e.g., second real-time controller 704) is now driving the first and second VSIs 300, 302 from its second switching signal pins 744. In this way, the master controller executes the control algorithm and actively drives the first and second VSIs 300, 302, while the slave real-time controller executes the same control algorithm, only without impacting the first and second VSIs 300, 302. The control algorithm 900 has four control loops current, flux-weakening, speed, and position. The inner-most loop is the current loop, followed by the flux-weakening loop, the speed loop, and finally, by the position loop (e.g., the outer-most loop). There are two closed loops for each motor windings 518, 520 (FIG. 5) within the current loop. Accordingly, there are four current loops with four proportional-integral regulators, as shown in FIG. 10. The outputs of the current loops are commanded voltages (e.g., voltages 1052, 1054, 1056, 1058, as shown in FIG. 10) for the direct and quadrature axis of both motor windings 518, 520.

Direct Clarke transformation blocks 902 and 904 sample all motor winding line currents 980 and 982 (see first A/D converter inputs 714 in FIG. 7), and convert them from a three-phase to a two-phase stationary reference frame 984, 986, by applying a direct magnitude-invariant Clarke transform:

$$i_{\alpha 1} = \frac{2}{3}\left(i_{a1} - \frac{1}{2}i_{b1} - \frac{1}{2}i_{c1}\right) = Re\{\underline{i}_1\}$$

$$i_{\beta 1} = \frac{1}{\sqrt{3}}(i_{b1} - i_{c1}) = Im\{\underline{i}_1\}$$

$$i_{\alpha 2} = \frac{2}{3}\left(i_{a2} - \frac{1}{2}i_{b2} - \frac{1}{2}i_{c2}\right) = Re\{\underline{i}_2\}$$

$$i_{\beta 2} = \frac{1}{\sqrt{3}}(i_{b2} - i_{c2}) = Im\{\underline{i}_2\}$$

and/or by applying a direct power-invariant Clarke transform:

$$i_{\alpha 1} = \sqrt{\frac{2}{3}}\left(i_{a1} - \frac{1}{2}i_{b1} - \frac{1}{2}i_{c1}\right) = Re\{\underline{i}_1\}$$

$$i_{\beta 1} = \frac{1}{\sqrt{2}}(i_{b1} - i_{c1}) = Im\{\underline{i}_1\}$$

$$i_{\alpha 2} = \sqrt{\frac{2}{3}}\left(i_{a2} - \frac{1}{2}i_{b2} - \frac{1}{2}i_{c2}\right) = Re\{\underline{i}_2\}$$

$$i_{\beta 2} = \frac{1}{\sqrt{2}}(i_{b2} - i_{c2}) = Im\{\underline{i}_2\}$$

The direct magnitude-invariant and power-invariant Clarke transforms are also known as transformations of decoupling that turn three-phase AC systems of the windings 518, 520 into orthogonal two-phase AC systems while either preserving the magnitude or power of the current polyphasors $i_1$ and $i_2$.

Direct Park transform blocks 906, 908 use the resolver measured rotor mechanical position $\theta_m$ that is converted to the electrical angle $\theta_e$ 978 (an output of position feedback update block 910), to convert motor line currents from a two-phase stationary reference frame to a synchronously rotating reference frame 988, 990, by applying direct Park transformation:

$$i_{d1} = i_{\alpha 1}\cos\theta_e + i_{\beta 1}\cos\theta_e$$

$$i_{q1} = -i_{\alpha 1}\sin\theta_e + i_{\beta 1}\cos\theta_e$$

$$i_{d2} = i_{\alpha 2}\cos(\theta_e - \gamma) + i_{\beta 2}\sin(\theta_e - \gamma)$$

$$i_{q2} = -i_{\alpha 2}\sin(\theta_e - \gamma) + i_{\beta 2}\cos(\theta_e - \gamma)$$

At current regulators block 912, current regulators in the d-q domain regulate direct and quadrature components of stator currents in both windings. The direct component is proportional to the stator flux and the quadrature component is proportional to the motor torque. The processing within the current regulators block 912 is discussed with reference to FIG. 10.

FIG. 10 illustrates a representative diagram of an algorithm 1000 used by the current regulators (within the current regulators block 912 of FIG. 9) in accordance with embodiments of the present technology and starts the discussion of the current loop. The inputs to the current regulators block 912 are: reference sum of first direct currents $i_{d1*}$, $i_{d2*}$ 1002, reference sum of first quadrature currents $i_{q1*}+i_{q2*}$ 1004, reference difference of second direct currents $i_{d1*}-i_{d2*}$ 1006, and the reference difference of second quadrature currents $i_{q1*}-i_{q2*}$ 1008, which are fed from the outputs of torque/current sharing block 914. Also, motor line currents 1034 and 1036 are input from the direct Park transform block 906, and motor line currents 1038 and 1040 are input from the direct Park transform block 908. The reference sums and differences of direct and quadrature currents are generated within the torque/current sharing block (block 914, FIG. 9). This block may utilize a current reference table shown in FIG. 11 or other correlation methods.

Four proportional-integral (PI) regulators 1010, 1012, 1014, 1016 can regulate the reference current sums and differences, together with four decoupling blocks 1018, 1020, 1022, 1024.

In some embodiments, the four decoupling blocks 1018, 1020, 1022, 1024 utilize optional decoupling terms that reduce (e.g., minimize) the cross-coupling influence between the d- and q-axis phases on one three-phase winding, as well as reducing (e.g., minimizing) cross-coupling influence between axes of both three-phase windings. The optional decoupling terms can include motor winding parameters such as direct axis self-inductance $L_d$, direct axis mutual inductance $M_d$, quadrature axis self-inductance $L_q$, quadrature axis mutual inductance $M_q$, rotor permanent magnet flux $O_m$, reference mechanical speed $\omega_{rm*}$, and/or reference current sums and differences. The decoupling equations of FIG. 10 are illustrated using these optional parameters. Other decoupling equations can be used. The decoupling terms can be defined by the equations that use motor parameters p, $L_d$, $L_q$, $M_d$, $M_q$, $\psi_m$ and reference speed $\omega_{m*}$ and sum and differences of respective direct and quadrature axis reference currents for the windings 518, 520 ($i_{d1*}$, $i_{d2*}$, $i_{q1*}$, and $i_{q2*}$). The decoupling generally can improve the dynamic response of the current loop. However, satisfactory results with the current loop's dynamic response can be obtained even without the decoupling terms, in which case their respective values are set to zero. For this reason, the decoupling terms and their equations can be considered optional.

In some embodiments, each of the four decoupling blocks 1018, 1020, 1022, 1024 receives an input 1042a, 1042b, 1042c, 1042d, respectively, from the position regulator block 916 (FIG. 9). The first decoupling block 1018 also receives the reference sum of the first quadrature current 1004a. The second decoupling block 1020 receives the reference difference of the second quadrature current 1008a. The third decoupling block 1022 receives the reference sum of first direct current 1002a, and the fourth decoupling block 1024 receives the reference difference of second direct current 1006a. If the optional parameters are used, the outputs of the four decoupling blocks 1018-1024 can be calculated using the following equations:

$\Delta(v_{d1*}+v_{d2*})=-p\omega_{m*}(L_q+M_q)(i_{q1*}+i_{q2*})$     Decoupling (1):

$\Delta(v_{d1*}-v_{d2*})=-p\omega_{m*}(L_q-M_q)(i_{q1*}-i_{q2*})$     Decoupling (2):

$\Delta(v_{q1*}+q_{q2*})=p\omega_{m*}[(L_d+M_d)(i_{d1*}+i_{d2*})+2\psi_m]$     Decoupling (3):

$\Delta(v_{q1*}-v_{q2*})=p\omega_{m*}(L_d-M_d)(i_{d1*}-i_{d2*})$     Decoupling (4):

If the optional decoupling parameters are not used, then decoupling terms become 0.

$\Delta(v_{d1*}+v_{d2*})=0$     Decoupling (1):

$\Delta(v_{d1*}-v_{d2*})=0$     Decoupling (2):

$\Delta(v_{q1*}+v_{q2*})=0$     Decoupling (3):

$\Delta(v_{q1*}-v_{q2*})=0$     Decoupling (4):

Outputs 1026, 1028, 1030, 1032 of the four PI regulators 1010, 1012, 1014, 1016, respectively, and outputs 1044, 1046, 1048, 1050 of the four decoupling blocks 1018, 1020, 1022, 1024, respectively, are reference voltage sums and differences that are converted to respective direct reference stator voltages 1052, 1054 and quadrature reference stator voltages 1056, 1058 using the following equations:

$v_{d1*}=\frac{1}{2}[(v_{d1*}+v_{d2*})+\Delta(v_{d1*}+v_{d2*})+(v_{d1*}-v_{d2*})+\Delta(v_{d1*}-v_{d2*})]$ $v_{d2*}=\frac{1}{2}[(v_{d1*}+v_{d2*})+\Delta(v_{d1*}+v_{d2*})-(v_{d1*}-v_{d2*})-\Delta(v_{d1*}-v_{d2*})]$ $v_{q1*}=\frac{1}{2}[(v_{q1*}+v_{q2*})+\Delta(v_{q1*}+v_{q2*})+(v_{q1*}-v_{q2*})+\Delta(v_{q1*}-v_{q2*})]$ $v_{q2*}=\frac{1}{2}[(v_{q1*}+v_{q2*})+\Delta(v_{q1*}+v_{q2*})-(v_{q1*}-v_{q2*})-\Delta(v_{q1*}-v_{q2*})]$ Returning to the representative configuration of FIG. 9, the current regulators block 912 transmits the direct and quadrature reference stator voltages 1052, 1056 for the first winding as d and q-axis quadrature components of stator commanded voltages 938 to inverse Park transform block 918, and transmits the direct and quadrature reference stator voltages 1054, 1058 for the second winding as d and q-axis quadrature components of stator commanded voltages 940 to inverse Park transform block 920. The commanded stator voltage components ($v_{d1*}$, $v_{q1*}$, $v_{d2*}$, $v_{q2*}$) can be converted from a synchronously rotating reference frame to a stationary reference frame with the following equations in the inverse Park transform blocks 918, 920:

$V_{\alpha 1*}=v_{d1*}\cos\theta_e - v_{q1*}\sin\theta_e$ $v_{\beta 1*}=v_{d1*}\sin\theta_e + v_{q1*}\cos\theta_e$ $v_{\alpha 2*}=v_{d2*}\cos(\theta_e-\gamma) - v_{q2*}\sin(\theta_e-\gamma)$ $v_{\beta 2*}=v_{d2*}\sin(\theta_e-\gamma) + v_{q2*}\cos(\theta_e-\gamma)$ The inverse Park transform block 918 outputs commanded stator voltage components in the stationary reference frame ($v_{\alpha 1*}$, $v_{\beta 1*}$) for the first winding to pulse width modulator (PWM) block 922. The inverse Park transform block 920 outputs commanded stator voltage components in the stationary reference frame ($v_{\alpha 2*}$, and $v_{\beta 2*}$) for the second winding to PWM block 924.

The PWM blocks 922, 924 can normalize the commanded stator voltages with the available DC bus voltage 926a, 926b, determine the depth of modulation, and output switching signals 928, 930 with an additional insertion of appropriate deadtimes. The generated switching signals 928, 930 can contain information about the PWM duty cycles of the PWM blocks 922, 924. The switching signals 928, 930 can be routed to the gate drivers circuitry 358 (FIG. 3) to drive the power switches 304-314. For reference, switching signals 928 and 930 are combined to form switching signals 134 (FIG. 1).

The switching signals 928, 930 can drive the commutation of the power switches 304-314 (FIG. 3) within the first and second VSIs 300, 302 (FIG. 3). For example, switching signals 928 for the first VSI 300 and switching signals 930 for the second VSI 302 from both the first and second real-time controllers 702, 704 (FIG. 7) are propagated to the switching signals bus 740 (FIG. 7). The switching signals bus 740 arbitrates which switching signals (from master or slave) are further propagated to the half-bridge gate drivers circuitry 358 (FIG. 3). From there on, these switching signals are used to drive the commutation (turn on and turn off) of the power switches 304-314. In some embodiments, the PWM blocks 922, 924 are implemented as a space vector PWM scheme (either continuous or discontinuous), a sine PWM scheme, and/or a sine PWM with a third harmonic injection scheme. In other embodiments, the switching frequency is either a fixed value and/or pseudo-randomized value within a range centered on a fixed frequency.

The position loop is discussed below. Information about the position of the rotor 404 is obtained from the two brushless resolvers 124, 126 (FIG. 1), and is based on the value of resolver fault signals 932. The resolver fault signals 932 can be included within the resolver excitation and feedback signals 128 and 130 (FIG. 1). First and second resolver position signals 934 and 936 can also be input to the position feedback update block 910.

If both resolvers 124, 126 operate without any fault conditions (e.g., loss of tracking, degradation of signal, loss of signal, and/or other detected faults), the rotor position is acquired from the first brushless resolver 124 (i.e., $\theta_m=\theta_{m1}$). However, if a fault condition is detected on the first brushless resolver 124, then the rotor position is acquired from the second brushless resolver 126 (i.e., $\theta_m=\theta_{m2}$). The electrical angle 978 (from the position feedback update block 910) that is used in Park transformations is obtained as $\theta_e=p\theta_m$, where p is the number of rotor pole pairs.

The speed loop is discussed below. Speed regulator block 942 receives the speed command signal $\omega_{m*}$ 944 from the position regulator block 916 and speed feedback signal 946 from speed feedback update block 948. The speed feedback update block 948 calculates the speed feedback signal 946 as a differentiated mechanical position over a speed loop sample time T in discrete time intervals kT using:

$$\omega_m(kT) = \frac{\theta_m(kT) - \theta_m((k-1)T)}{T}, k = 1, 2, 3, \ldots$$

The output of the speed regulator block 942 gives the commanded value of the overall motor torque $T_{e*}$ 950 that is fed to an input of Maximum Torque Per Amp (MTPA) and flux-weakening block 952.

The flux-weakening loop is discussed below. The MTPA and flux-weakening block 952 can determine the overall reference direct and quadrature axis stator currents 954 and 956 as:

$$i_{d*} = 0$$

$$i_{q*} = \frac{T_{e*}}{1.5p\psi_m}$$

The two outputs ($i_{d*}$, $i_{s*}$) 954, 956 from MTPA and flux-weakening block 952 may be routed to inputs of the torque/current sharing block 914. The torque/current sharing block 914 can determine the reference for how the torque is shared between the two windings, as well as quadrature currents $i_{q1*}$, $i_{q2*}$ for both windings, based on the functional motor phases information 958, received from fault detection block 960, as shown in FIG. 11.

Fault detection block 960 receives fault signals from the fault detection circuitry 364 (FIG. 3). The fault signals that are coming in are overvoltage, undervoltage, and/or overcurrent (on all line currents of both first and second VSIs 300, 302 and on input DC-link currents of both first and second VSIs 300, 302). If the faults are detected on one of the first and second VSIs 300, 302, then the fault detection block 960 sets the corresponding PWMx_disable signal (x=1, 2) to a high logic level. The PWMx_disable signals are routed to PWM blocks 922, 924. When the PWMx_disable signals are set to low logic level, the corresponding PWM blocks 922, 924 generate the switching signals 928, 930 that power the switches 304-314 on and off. When the PWMx_disable signals are set to high logic level, the corresponding PWM blocks 922, 924 generates switching signals 928, 930 that turn off all power switches 304-314 inside the corresponding (faulted) VSI 300, 302. Similarly, fault detection circuitry 364 generates gate driver disable signals that turn off half-bridge gate drivers circuitry 358 (FIG. 3) for the faulted VSI 300, 302, or faulted half-bridge 330, 332, 334 within one of the first and second VSIs 300, 302.

FIG. 11 is a representative look-up table 1100 that can be used by the torque/current sharing block 914 (FIG. 9) in accordance with the embodiments of the present technology. $T_{e*}$ is the output of the speed regulator block 942, the commanded value of overall motor torque 950. The torque/current sharing block 914 can use the information in the look-up table 1100 to determine reference currents for the two sets of windings. The reference currents, in the form of reference sums and differences ($i_{d1*}+i_{d2*}$, $i_{q1*}+i_{q2*}$, $i_{d1*}-i_{d2*}$, $i_{q1*}-i_{q2*}$) can provide the inputs of the current loop. The reference sums $i_{d1*}+i_{d2*}$ 962, $i_{q1*}+i_{q2*}$ 964 and reference differences $i_{d1*}-i_{d2*}$ 966, $i_{q1*}-i_{q2*}$ 968 can be input to the current regulators block 912. The outputs of the current regulators block 912 are the d and q-axis quadrature components of stator commanded voltages 938, 940 for both windings. Although the look-up table 1100 is shown in this example, it should be understood that other correlation methods and systems could be used to determine the reference currents.

When motor 110 operates within the constant torque region, the d-axis current commanded value can be maintained at zero (no flux weakening). For example, the constant torque region can be a speed region of an electric motor between zero speed and some speed point (typically called base speed), where the maximum motor torque is limited only by the allowable current rating of the motor and power electronics. However, once the motor speed command increases beyond the boundaries of the constant torque region (into the constant power region), depending on the demand on the output of the current regulators block 912 (the d and q-axis quadrature components of stator commanded voltages ($v_{d1*}$, $v_{q1*}$; $v_{d2*}$, $v_{q2*}$) 938, 940), commanded speed (speed command signal $\omega_{m*}$ 944) and the available DC bus voltage ($v_{dc}$), the commanded direct axes can have a negative value. The motor speed command can come directly from the flight control unit or flight control computer in some embodiments. If the flight control unit is commanding the position, then the motor speed command can come from the output of the position regulator block 916.

The position regulator block 916 closes the position control loop with position command $\theta_{m*}$ 970 (e.g., from the flight control unit, flight computer) and speed feedback $\theta_m$ 972 that is obtained from the position feedback update block 910. Additionally, the position regulator block 916 uses measured DC bus currents $i_{dc1}$ 974, $i_{dc2}$ 976 from both of the first and second VSIs 300, 302 (bus currents not shown in FIG. 3), to limit the acceleration power of the actuator 100 and decrease the speed reference $\omega_{m*}$ (speed command signal 944) if necessary. For reference, the DC bus currents $i_{dc1}$, $i_{dc2}$ are also input to the first and second A/D converter inputs 714, 716 on the first and second real-time controllers 702, 704, respectively, of FIG. 7.

In some embodiments, the current regulators in the current regulators block 912 are designed as proportional-integral (PI) regulators, the MTPA and flux-weakening block 952 is designed as a proportional-integrator (PI) regulator or as a pure integrator (I), the speed regulator block 942 is designed as a proportional-integral-differential (PID) regulator, and/or the position regulator block 916 is designed as a proportional (P) or a proportional-integral (PI) regulator. All regulators can have adequate limiters for their outputs and integral terms (where applicable) and appropriate feed-forward terms (where applicable). Additionally, in at least some embodiments, regulators with integral terms can have adequate anti-windup protection mechanisms.

The technology described above is suitable for space and aerospace rated applications, with short and/or intermittent duty cycles (from several seconds to several minutes) that require high power density and power ranges between 0.1 and 10 kW. Quite often, these applications have serious mass, volume, and cost-constraints with stringent performance, fault-tolerance, and safety requirements that can be achieved straightforwardly by using the actuator 100 (FIG. 1). The actuator 100 can be coupled to an appropriate gearbox to transform mechanical power delivered on the shaft of the actuator 100. In some embodiments, if it is required to convert the rotary motion of the actuator 100 into a linear motion, the motor shaft of the actuator 100 can be coupled with a linear screw actuator, such as a lead screw, ball screw, roller screw, and/or similar.

From the foregoing, it will be appreciated that specific embodiments of the disclosed technology have been described herein for illustration purposes. Still, various modifications may be made without deviating from the technology. For example, the representative motors can have numbers of stator teeth and stator slots other than twenty-four. Different slot winding configurations can also be considered. High voltage can be used with specific motors instead of low voltage. Certain aspects of the technology described in the context of particular embodiments may be combined or eliminated in other embodiments. For example, the control algorithms may be applied to a motor with a single winding. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein. Some embodiments can be used in other environments that require a high degree of safety and reliability, such as mining and/or gas and oil industries. The following examples provide additional embodiments of the present technology.

We claim:

1. A fault-tolerant rotating electromechanical actuator, comprising:
a permanent magnet synchronous motor comprising first and second windings on a stator, each of the first and second windings comprising three phases;
first and second voltage source inverters configured to provide output signals independently of each other, the first voltage source inverter configured to provide a first set of output signals to drive the three phases of the first winding, the second voltage source inverter configured to provide a second set of output signals to drive the three phases of the second winding, the three phases of the first windings configured to be driven simultaneously with the three phases of the second winding; and
control electronics configured to monitor signals associated with the three phases of the first and second windings, the control electronics configured to detect a first fault condition that is located within a first phase of the first winding, the control electronics configured to command the first voltage source inverter to drive only second and third phases of the first winding and to command the second voltage source inverter to drive the three phases of the second winding simultaneously with the first voltage source inverter driving only the second and third phases of the first winding,
wherein the control electronics are further configured to implement interactive control loops for monitoring and adjusting the output signals to drive non-faulted phases of the first and second windings, the interactive control loops including a current loop configured to provide input to at least a flux weakening loop, the current loop further receiving reference currents, in the form of reference sums and differences, from the flux-weakening loop.

2. The fault-tolerant rotating electromechanical actuator of claim 1, wherein the control electronics are further configured to control speed of the motor and/or rotor angular position of the motor based on at least one of current, voltage, and fault feedback signals output by the first and second voltage source inverters, the control electronics implementing interactive control loops for monitoring and adjusting the output signals for driving non-faulted phases of the first and second windings based on current, flux-weakening, the speed of the motor, and the position of the motor.

3. The fault-tolerant rotating electromechanical actuator of claim 1, wherein the control electronics are further configured to implement interactive control loops for monitoring and adjusting the output signals to drive non-faulted phases of the first and second windings, the interactive control loops including two closed current loops for each of the first and second windings.

4. The fault-tolerant rotating electromechanical actuator of claim 1, wherein the motor includes a rotor and at least one brushless resolver, wherein the control electronics are further configured to implement interactive control loops for monitoring and adjusting the output signals to drive non-faulted phases of the first and second windings, and wherein the interactive control loops include a position loop configured to receive position information about the rotor from the at least one brushless resolver.

5. The fault-tolerant rotating electromechanical actuator of claim 1, wherein the control electronics are further configured to implement interactive control loops for monitoring and adjusting the output signals to drive non-faulted phases of the first and second windings, the interactive control loops including a flux weakening loop configured to determine reference currents based on at least a speed command signal, a commanded value of overall motor torque, and stator commanded voltages.

6. The fault-tolerant rotating electromechanical actuator of claim 1, wherein the motor includes a rotor and at least one brushless resolver, wherein the control electronics are further configured to implement interactive control loops for monitoring and adjusting the output signals to drive non-faulted phases of the first and second windings, the interactive control loops including a position loop and a speed loop, the position loop configured to output a speed control signal to the speed loop based on at least a position command and received position information about the rotor from the at least one brushless resolver.

7. The fault-tolerant rotating electromechanical actuator of claim 1, wherein the control electronics are further configured to, in response to the first phase of the first winding being turned off, adjust the first and second sets of output signals to redistribute torque and current requirements between the second and third phases of the first winding and the three phases of the second winding to maintain speed and/or position of the motor.

8. The fault-tolerant rotating electromechanical actuator of claim 1, wherein the control electronics are further configured to detect a second fault condition within one of the three phases of the second winding, and wherein the control electronics are further configured to, in response to the faulted phase in the second winding having a different phase than the first phase of the first winding, command the second voltage source inverter to drive only the two phases of the second winding that do not have a fault condition.

9. The fault-tolerant rotating electromechanical actuator of claim 1, wherein the control electronics are further configured to, in response to detecting the first fault condition, adjust at least one of a voltage level and a current level driving the second and third phases of the first winding and the three phases of the second winding.

10. The fault-tolerant rotating electromechanical actuator of claim 1, wherein the first fault condition is determined based on detecting A) a zero phase current associated with the first winding or B) a zero voltage between the first winding and at least one of the second and third windings.

11. The fault-tolerant rotating electromechanical actuator of claim 1, wherein the three phases of the first winding are electrically displaced with respect to each other.

12. The fault-tolerant rotating electromechanical actuator of claim 1, wherein each of the first and second windings have 120 electrical degrees displacement between the three phases, and the first and second windings are displaced by 30 electrical degrees.

13. The fault-tolerant rotating electromechanical actuator of claim 1, further comprising an energy storage device configured to provide voltage at a voltage level approximately equal to or less than 50 volts to at least the first and second voltage source inverters.

14. The fault-tolerant rotating electromechanical actuator of claim 1, wherein the first and second voltage source inverters include at least one current sensor associated with each of the three phases of the first and second windings.

15. The fault-tolerant rotating electromechanical actuator of claim 1, wherein the control electronics further comprise first and second real-time controllers, wherein the first real-time controller is configured to control the first and second voltage source inverters, wherein the second real-time controller is configured to control the first and second voltage source inverters, in response to a fault being experienced by the first real-time controller.

16. A method for controlling a rotating electromechanical actuator with two three-phase stator windings, comprising:
simultaneously driving three phases of each of first and second windings of a motor using output signals of at least one voltage source inverter;
detecting a fault that is located within a first phase of the first winding;
driving only non-faulted second and third phases of the first winding and the three phases of the second winding using the output signals of the at least one voltage source invertor, wherein the driving includes:
implementing interactive control loops for monitoring and adjusting the output signals to drive non-faulted phases of the first and second windings, the interactive control loops including a current loop configured to provide input to at least a flux weakening loop, the current loop further receiving reference currents, in the form of reference sums and differences, from the flux-weakening loop; and
adjusting the output signals of the at least one voltage source invertor to the second and third phases of the first winding and the three phases of the second winding based on interactive control loops.

17. The method of claim 16, wherein the interactive control loops monitor and adjust the output signals based on at least current levels, voltage levels, speed of the motor and rotor angular position of the motor.

18. The method of claim 16, further comprising:
detecting a second fault condition within a second phase of the first winding; and
driving only the three phases of the second winding.

19. The method of claim 16, wherein the detecting the fault further comprises comparing at least one of current and voltage signals generated by the at least one voltage source inverter to drive the three phases of the first and second windings to predefined levels and/or ranges.

* * * * *